(12) United States Patent
Chen

(10) Patent No.: US 12,075,957 B2
(45) Date of Patent: *Sep. 3, 2024

(54) FLOOR CLEANING MACHINES HAVING INTELLIGENT SYSTEMS, ASSOCIATED SUB-ASSEMBLIES INCORPORATING INTELLIGENT SYSTEMS, AND ASSOCIATED METHODS OF USE

(71) Applicant: INTELLIGENT CLEANING EQUIPMENT HOLDINGS CO. LTD., Tortola (VG)

(72) Inventor: Nai Pong Simon Chen, Guangdong (CN)

(73) Assignee: INTELLIGENT CLEANING EQUIPMENT HOLDINGS CO. LTD., Tortola (VG)

( * ) Notice: Subject to any disclaimer, the term of this patent is extended or adjusted under 35 U.S.C. 154(b) by 9 days.

This patent is subject to a terminal disclaimer.

(21) Appl. No.: 18/513,066

(22) Filed: Nov. 17, 2023

(65) Prior Publication Data

US 2024/0099535 A1 Mar. 28, 2024

Related U.S. Application Data

(63) Continuation-in-part of application No. 17/937,976, filed on Oct. 4, 2022, now Pat. No. 11,918,161, and
(Continued)

(30) Foreign Application Priority Data

Feb. 23, 2022 (WO) ................. PCT/CN2022/077479

(51) Int. Cl.
*A47L 11/40* (2006.01)
*A47L 11/283* (2006.01)
(Continued)

(52) U.S. Cl.
CPC ......... *A47L 11/4011* (2013.01); *A47L 11/283* (2013.01); *A47L 11/4008* (2013.01);
(Continued)

(58) Field of Classification Search
CPC .................. A47L 11/4011; A47L 11/283; A47L 11/4008; A47L 11/4013; A47L 11/4044;
(Continued)

(56) References Cited

U.S. PATENT DOCUMENTS 3,204,280 A 9/1965 Cleatis et al.
3,702,488 A 11/1972 Kasper
(Continued)

FOREIGN PATENT DOCUMENTS

CN 1630484 A 6/2005
CN 101292853 A 10/2008
(Continued)

OTHER PUBLICATIONS

Co-pending U.S. Appl. No. 18/194,310, inventor Chen; Nai Pong Simon, filed Mar. 31, 2023.
(Continued)

*Primary Examiner* — Sisay Yacob
(74) *Attorney, Agent, or Firm* — Wilson Sonsini Goodrich & Rosati

(57) ABSTRACT

A floor cleaning machine having an intelligent system including a recovery tank sub-assembly, a vacuum fan sub-assembly, a solution tank sub-assembly, wherein the solution tank sub-assembly preferably includes a secondary electrochemical cell, a solution flow sub-assembly, a control console sub-assembly, a frame and wheel sub-assembly and/or a frame and transaxle sub-assembly, a scrub head sub-assembly, a scrub head lift sub-assembly, a squeegee sub-assembly, a solution flow sub-assembly, and an intelligent system associated with at least one of the above-
(Continued)

identified sub-assemblies, wherein the intelligent system at least one of selectively gathers, obtains, monitors, stores, records, and analyzes data associated with components of the floor cleaning machine assembly, and at least one of controllably communicates and disseminates such data with at least one of another system and user.

27 Claims, 26 Drawing Sheets

Related U.S. Application Data a continuation-in-part of application No. 17/837,822, filed on Jun. 10, 2022, which is a continuation of application No. PCT/CN2022/088167, filed on Apr. 21, 2022, said application No. 17/937,976 is a continuation of application No. 16/933,403, filed on Jul. 20, 2020, now Pat. No. 11,490,775, which is a continuation of application No. 16/595,943, filed on Oct. 8, 2019, now Pat. No. 10,729,301, which is a continuation of application No. 16/026,649, filed on Jul. 3, 2018, now Pat. No. 10,433,694, which is a continuation of application No. 14/666,904, filed on Mar. 24, 2015, now Pat. No. 10,076,220.

(60) Provisional application No. 61/969,559, filed on Mar. 24, 2014.

(51) Int. Cl.
    *G06Q 10/20* (2023.01)
    *G06Q 30/0601* (2023.01)
    *H04Q 9/00* (2006.01)

(52) U.S. Cl.
    CPC ....... *A47L 11/4013* (2013.01); *A47L 11/4044* (2013.01); *A47L 11/4055* (2013.01); *A47L 11/4061* (2013.01); *A47L 11/4083* (2013.01); *G06Q 10/20* (2013.01); *G06Q 30/0633* (2013.01); *H04Q 9/00* (2013.01); *H04Q 2209/43* (2013.01); *H04Q 2209/823* (2013.01)

(58) Field of Classification Search
    CPC ............. A47L 11/4055; A47L 11/4061; A47L 11/4083; G06Q 10/20; G06Q 30/0633; H04Q 9/00; H04Q 2209/43; H04Q 2209/823
    See application file for complete search history.

(56) References Cited

U.S. PATENT DOCUMENTS

| | | |
|---|---|---|
| 3,761,987 A | 10/1973 | Nayfa et al. |
| 3,879,789 A | 4/1975 | Kasper |
| 3,974,541 A | 8/1976 | Silvis et al. |
| 4,369,544 A | 1/1983 | Parisi |
| 4,580,313 A | 4/1986 | Blehert |
| 4,667,364 A * | 5/1987 | Meili .................. A47L 11/4016 15/353 |
| 4,675,935 A * | 6/1987 | Kasper ................ A47L 11/4011 15/319 |
| 4,716,621 A | 1/1988 | Zoni |
| 4,819,676 A | 4/1989 | Blehert et al. |
| 4,831,684 A | 5/1989 | Duncan |
| 5,093,955 A | 3/1992 | Blehert et al. |
| 5,239,720 A | 8/1993 | Wood et al. |
| 5,265,300 A | 11/1993 | O'Hara et al. |
| 5,435,035 A * | 7/1995 | Fujimoto ............ A47L 11/4005 15/49.1 |
| 5,566,422 A | 10/1996 | Geyer |
| 5,621,301 A | 4/1997 | Allen et al. |
| 6,519,808 B2 | 2/2003 | Legatt et al. |
| 6,532,672 B1 | 3/2003 | Gottlieb |
| 6,585,827 B2 | 7/2003 | Field et al. |
| 7,199,711 B2 | 4/2007 | Field |
| 7,269,877 B2 * | 9/2007 | Tondra .................. A47L 9/2889 15/319 |
| 7,403,360 B2 | 7/2008 | Cunningham |
| 7,448,114 B2 | 11/2008 | Basham et al. |
| 7,461,430 B2 | 12/2008 | Reick-Mitrisin et al. |
| 7,533,435 B2 | 5/2009 | Pedlar et al. |
| 7,891,046 B2 | 2/2011 | Field et al. |
| 8,584,294 B2 * | 11/2013 | Loring ................. A47L 11/4038 15/49.1 |
| 8,719,999 B2 | 5/2014 | Field |
| 9,480,379 B2 | 11/2016 | Yoon et al. |
| 9,868,208 B2 | 1/2018 | Meier |
| 9,873,196 B2 | 1/2018 | Szatmary et al. |
| 9,943,206 B2 | 4/2018 | Yang et al. |
| 10,010,230 B2 | 7/2018 | Chen |
| 10,016,112 B2 | 7/2018 | Chen |
| 10,016,113 B2 | 7/2018 | Chen |
| 10,060,827 B2 | 8/2018 | Schnell et al. |
| 10,076,220 B2 | 9/2018 | Chen |
| 10,089,586 B2 | 10/2018 | Vestal et al. |
| 10,213,921 B2 | 2/2019 | Meier |
| 10,241,514 B2 | 3/2019 | Passot et al. |
| 10,251,522 B2 | 4/2019 | Chen |
| 10,433,694 B2 | 10/2019 | Chen |
| 10,443,694 B2 | 10/2019 | Sheker et al. |
| 10,545,074 B2 | 1/2020 | Meier |
| 10,548,446 B2 | 2/2020 | Chen |
| 10,548,447 B2 | 2/2020 | Chen |
| 10,602,901 B2 | 3/2020 | Chen |
| 10,729,301 B2 | 8/2020 | Chen |
| 10,807,230 B2 | 10/2020 | Szatmary et al. |
| 10,932,639 B2 | 3/2021 | Chen |
| 11,037,320 B1 * | 6/2021 | Ebrahimi Afrouzi ..... G06T 7/90 |
| 11,071,432 B2 | 7/2021 | Chen |
| 11,182,201 B1 | 11/2021 | Magcale |
| 11,369,246 B2 | 6/2022 | Chen |
| 11,490,775 B2 | 11/2022 | Chen |
| 11,641,998 B2 | 5/2023 | Chen |
| 2001/0004719 A1 | 6/2001 | Sommer |
| 2002/0156556 A1 | 10/2002 | Ruffner |
| 2003/0136666 A1 | 7/2003 | Ophardt |
| 2004/0210360 A1 | 10/2004 | Dietz et al. |
| 2005/0254185 A1 * | 11/2005 | Cunningham ..... H01R 13/7175 361/23 |
| 2006/0150362 A1 | 7/2006 | Mitchell |
| 2006/0204383 A1 | 9/2006 | Kushida et al. |
| 2007/0186367 A1 | 8/2007 | Field et al. |
| 2007/0186368 A1 | 8/2007 | Field et al. |
| 2007/0186369 A1 * | 8/2007 | Field .................... A47L 11/302 15/320 |
| 2007/0240276 A1 | 10/2007 | Pedlar |
| 2007/0250212 A1 | 10/2007 | Halloran et al. |
| 2008/0284363 A1 | 11/2008 | Lucas et al. |
| 2009/0254240 A1 | 10/2009 | Olsen, III et al. |
| 2011/0004342 A1 * | 1/2011 | Knopow ............. G05D 1/0221 701/25 |
| 2012/0097201 A1 * | 4/2012 | Field ..................... A61L 2/186 134/58 R |
| 2012/0271645 A1 * | 10/2012 | Dain ..................... G06Q 10/00 705/1.1 |
| 2013/0030750 A1 | 1/2013 | Kim et al. |
| 2013/0098402 A1 | 4/2013 | Yoon et al. |
| 2013/0274920 A1 | 10/2013 | Abramson et al. |
| 2014/0116469 A1 | 5/2014 | Kim et al. |
| 2014/0156035 A1 * | 6/2014 | Groschen ............ A47L 11/4002 700/90 |
| 2014/0214205 A1 | 7/2014 | Kwon et al. |
| 2014/0247941 A1 | 9/2014 | Gu et al. |
| 2014/0361074 A1 * | 12/2014 | Kumar .................... G06F 16/93 235/376 |
| 2014/0365258 A1 * | 12/2014 | Vestal .................... G16H 40/20 901/1 |
| 2014/0366317 A1 | 12/2014 | Wydra |
| 2015/0039157 A1 | 2/2015 | Wolfe et al. |

(56) References Cited

U.S. PATENT DOCUMENTS

| | | | |
|---|---|---|---|
| 2015/0045990 A1* | 2/2015 | Shih | A47L 11/4011 |
| | | | 701/2 |
| 2016/0078413 A1 | 3/2016 | Drew | |
| 2016/0195577 A1* | 7/2016 | Osaka | G01N 27/4161 |
| | | | 204/407 |
| 2016/0288328 A1 | 10/2016 | Bingham et al. | |
| 2016/0345791 A1 | 12/2016 | Britain et al. | |
| 2016/0364285 A1* | 12/2016 | Swayne | G06F 11/0793 |
| 2017/0049288 A1 | 2/2017 | Knutson et al. | |
| 2017/0169400 A1* | 6/2017 | Diwinsky | G06F 18/24 |
| 2017/0205822 A1 | 7/2017 | Shin et al. | |
| 2017/0278312 A1 | 9/2017 | Minster et al. | |
| 2018/0008113 A1 | 1/2018 | Sedam | |
| 2018/0189748 A1 | 7/2018 | Anderson et al. | |
| 2018/0360286 A1 | 12/2018 | Habbas et al. | |
| 2019/0087789 A1* | 3/2019 | Barkat | G06Q 10/06316 |
| 2019/0171210 A1 | 6/2019 | Passot et al. | |
| 2019/0225233 A1* | 7/2019 | Tod | G05D 1/0088 |
| 2019/0389064 A1 | 12/2019 | High et al. | |
| 2020/0074412 A1* | 3/2020 | Colena | G06N 5/01 |
| 2020/0103921 A1 | 4/2020 | Voorhies et al. | |
| 2020/0150003 A1 | 5/2020 | Meier | |
| 2020/0175640 A1 | 6/2020 | Meier et al. | |
| 2020/0329933 A1* | 10/2020 | Hackert | A47L 9/1454 |
| 2020/0342421 A1 | 10/2020 | Ramer et al. | |
| 2021/0074163 A1* | 3/2021 | Robeson | G05D 1/0291 |
| 2021/0204786 A1 | 7/2021 | Chen | |
| 2022/0042824 A1* | 2/2022 | Dhayalkar | G01C 21/005 |
| 2023/0233047 A1 | 7/2023 | Chen | |

FOREIGN PATENT DOCUMENTS

| | | |
|---|---|---|
| CN | 101421054 A | 4/2009 |
| CN | 102571905 A | 7/2012 |
| CN | 202830837 U | 3/2013 |
| CN | 103154955 A | 6/2013 |
| CN | 103167821 A | 6/2013 |
| CN | 203034105 U | 7/2013 |
| CN | 103866728 A | 6/2014 |
| CN | 104933538 A | 9/2015 |
| CN | 105631577 A | 6/2016 |
| CN | 106535730 A | 3/2017 |
| CN | 107230012 A | 10/2017 |
| CN | 108230091 A | 6/2018 |
| CN | 109154827 A | 1/2019 |
| CN | 109325601 A | 2/2019 |
| CN | 110244585 A | 9/2019 |
| CN | 110448232 A | 11/2019 |
| CN | 111083231 A | 4/2020 |
| CN | 111882084 A | 11/2020 |
| CN | 112068563 A | 12/2020 |
| CN | 112205926 A | 1/2021 |
| CN | 112703457 A | 4/2021 |
| CN | 113365253 A | 9/2021 |
| CN | 113835401 A | 12/2021 |
| EP | 0940735 A2 | 9/1999 |
| EP | 1755431 A1 | 2/2007 |
| EP | 1755431 B1 | 7/2013 |
| EP | 2628427 A2 | 8/2013 |
| JP | 2009028831 A | 2/2009 |
| KR | 20120016403 A | 2/2012 |
| KR | 1020130027345 | 3/2013 |
| WO | WO-03041554 A1 | 5/2003 |
| WO | WO-2007092597 A2 | 8/2007 |
| WO | WO-2015106142 A1 | 7/2015 |
| WO | WO-2015148501 A1 | 10/2015 |
| WO | WO-2015148553 A1 | 10/2015 |
| WO | WO-2017149500 A1 | 9/2017 |
| WO | WO-2020176838 A1 | 9/2020 |
| WO | WO-2023159394 A1 | 8/2023 |
| WO | WO-2023159737 A1 | 8/2023 |

OTHER PUBLICATIONS

Co-pending U.S. Appl. No. 18/417,042, inventor Chen; Nai Pong Simon, filed Jan. 19, 2024.

Co-pending U.S. Appl. No. 18/540,428, inventor Chen; Nai Pong Simon, filed Dec. 14, 2023.

Leonardi, et al. A Risk-Based Approach to Automate Preventive Maintenance Tasks Generation by Exploiting Autonomous Robot Inspections in Wind Farms. in IEEE Access, vol. 7, pp. 49568-49579, 2019, doi: 10.1109/ACCESS.2019.2908777.

* cited by examiner

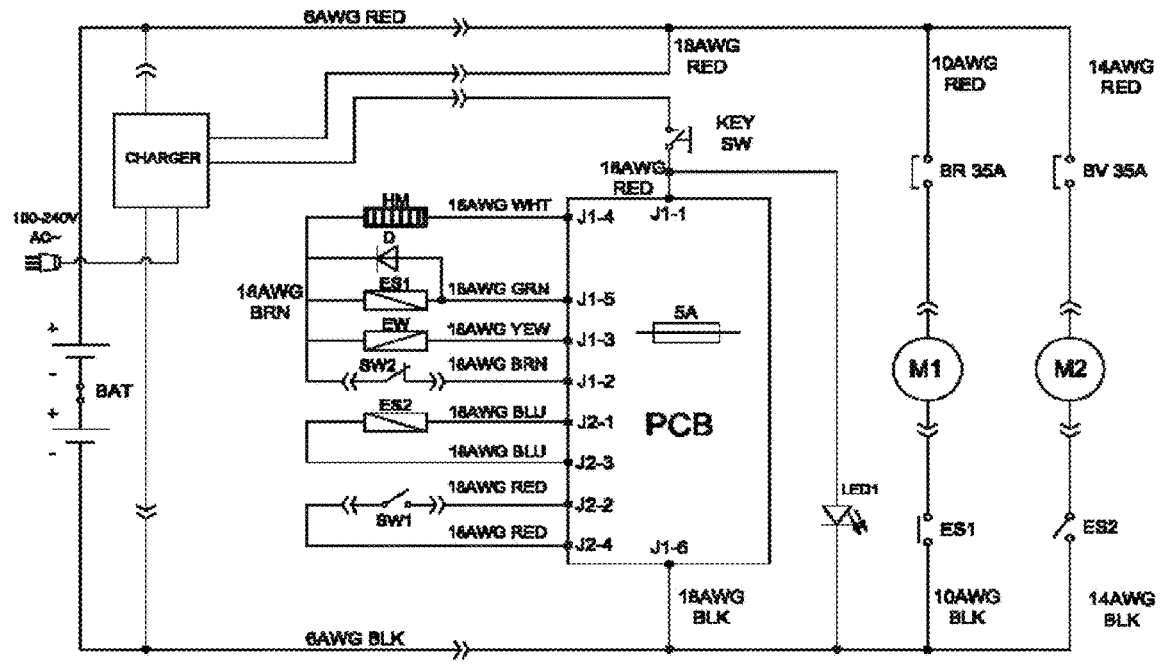

BAT: 2-12V Batteries
CHARGER: On board battery charger
KEY SW: Main power Key switch
HM: Hour meter
D: Diode
ES1: Brush motor solenoid switch
EW: Solution solenoid valve switch
SW2: Safe switch, Scrub head lifting
ES2: Vacuum motor relay ES2: Vacuum motor relay
SW1: Control handle start bail switch
PCB: Function electronic board
LED1: Running lights
BR: Circuit breaker, Brush motor
BV: Circuit breaker, Vacuum motor
M1: Brush motor
M2: Vacuum motor

Figure 13A

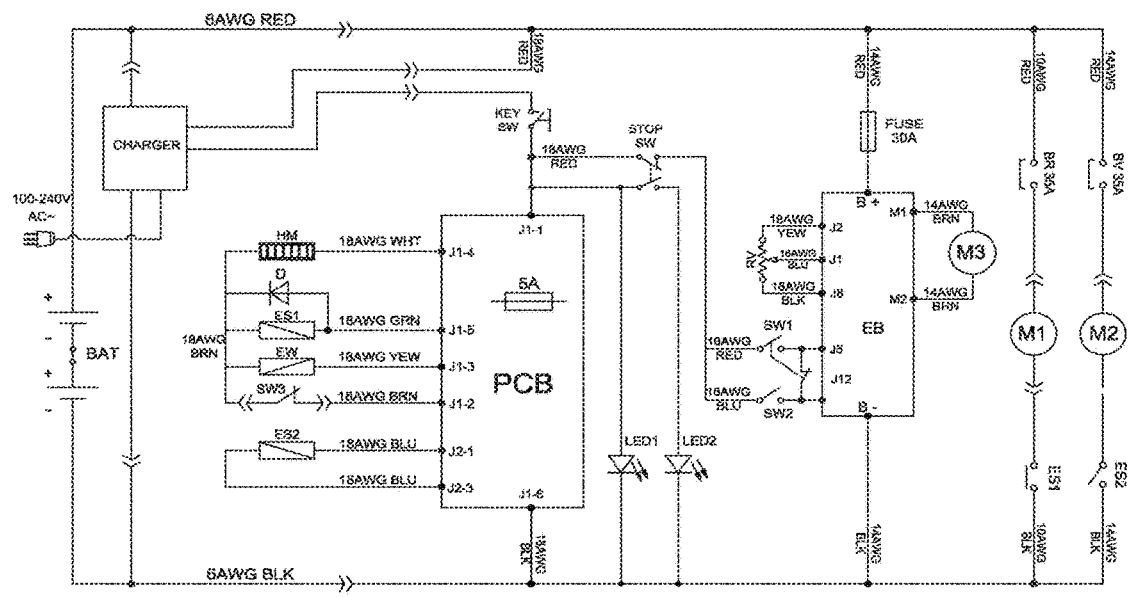

BAT: 2-12V Batteries
CHARGER: On board battery charger
KEY SW: Main power Key switch
HM: Hour meter
D: Diode
ES1: Brush motor solenoid switch
EW: Solution solenoid valve switch
SW3: Safe switch, scrub head lifting
ES2: Vacuum motor relay
PCB: Function electronic board
STOP SW: Emergency stop switch LED1: Running lights
LED2: Emergency stop lights
RV: Speed potentiometer
SW1: Control handle bail switch, forward
SW2: Control handle bail switch, backward
EB: Speed control board
M3: Transaxle motor
BR: Circuit breaker, Brush motor
BV: Circuit breaker, Vacuum motor
M1: Brush motor
M2: Vacuum motor

Figure 13B

FLOOR CLEANING MACHINES HAVING INTELLIGENT SYSTEMS, ASSOCIATED SUB-ASSEMBLIES INCORPORATING INTELLIGENT SYSTEMS, AND ASSOCIATED METHODS OF USE

CROSS-REFERENCE TO RELATED APPLICATIONS

This application is a continuation-in-part of U.S. application Ser. No. 17/837,822, filed Jun. 10, 2022, which is a continuation of International Application No. PCT/CN2022/088167 filed on Apr. 21, 2022, which claims priority to International Application No. PCT/CN2022/077479 filed on Feb. 23, 2022. Further, the instant application is a continuation-in-part of U.S. application Ser. No. 17/937,976, filed Oct. 4, 2022, which is a continuation of U.S. application Ser. No. 16/933,403, filed Jul. 20, 2020, now U.S. Pat. No. 11,490,775, which is a continuation of U.S. application Ser. No. 16/595,943, filed Oct. 8, 2019, now U.S. Pat. No. 10,729,301, which is a continuation of U.S. application Ser. No. 16/026,649, filed Jul. 3, 2018, now U.S. Pat. No. 10,433,694, which is a continuation of U.S. application Ser. No. 14/666,904, filed Mar. 24, 2015, now U.S. Pat. No. 10,076,220, which claims the benefit of U.S. Provisional Application Ser. No. 61/969,559, filed Mar. 24, 2014, all of which are hereby incorporated herein by reference in their entirety—including all references and appendices cited therein.

BACKGROUND

1. Field

The disclosed technology relates in general to floor cleaning machines and, more particularly, to floor cleaning machines having intelligent systems that have the capacity to selectively gather, obtain, monitor, store, record, and analyze data associated with components of the floor cleaning machines and controllably communicate and disseminate such data with other systems and users. The disclosed technology further relates to floor cleaning machine sub-assemblies including, but not limited to, secondary electrochemical cells having intelligent systems, as well as associated methods for using the same.

2. Background Art

Robots and/or machines may be used to perform tasks, provide services, and navigate environments autonomously or semi-autonomously. Multiple robots and/or machines may be distributed across different geographic locations and may interface or communicate with one or more central servers.

Floor cleaning machines and associated systems have been known in the art for years and are the subject of a plurality of patents and/or publications, including: U.S. Pat. No. 8,584,294 entitled "Floor Cleaner Scrub Head Having a Movable Disc Scrub Member," U.S. Pat. No. 7,448,114 entitled "Floor Sweeping and Scrubbing Machine," U.S. Pat. No. 7,269,877 entitled "Floor Care Appliance with Network Connectivity," U.S. Pat. No. 7,199,711 entitled "Mobile Floor Cleaner Data Communication," U.S. Pat. No. 5,265,300 entitled "Floor Scrubber," U.S. Pat. No. 5,239,720 entitled "Mobile Surface Cleaning Machine," U.S. Pat. No. 5,093,955 entitled "Combined Sweeper and Scrubber," U.S. Pat. No. 4,831,684 entitled "Cleaning Vehicles," U.S. Pat. No. 4,819,676 entitled "Combination Sweeping and Scrubbing System and Method," U.S. Pat. No. 4,716,621 entitled "Floor and Bounded Surface Sweeper Machine," U.S. Pat. No. 4,667,364 entitled "Floor-Cleaning Machine," U.S. Pat. No. 4,580,313 entitled "Walk Behind Floor Maintenance Machine," and European Patent Number 2,628,427 A2 entitled "Suction Device with a Suction Device Transmitter and External Communication Device Thereof,"— all of which are hereby incorporated herein by reference in their entirety including all references cited therein.

U.S. Pat. No. 8,584,294 appears to disclose a scrub head that includes a first disc scrub member, a movable support having first and second positions, and a movable disc scrub member. The first disc scrub member is rotatable about a first vertical axis. The movable disc scrub member is rotatable about a second vertical axis and is connected to the movable support. The movable disc scrub member is configured to move relative to the first disc scrub member along first and second orthogonal axes of a horizontal plane, which is transverse to the first and second vertical axes, between first and second positions respectively corresponding to the first and second positions of the movable support.

U.S. Pat. No. 7,448,114 appears to disclose a hard floor sweeping and scrubbing machine which includes a mobile body comprising a frame supported on wheels for travel over a surface, a motorized cleaning head, a waste hopper, a hopper lift and a vacuum squeegee. The motorized cleaning head is attached to the mobile body and is configured to perform sweeping and scrubbing operations on the surface. The waste hopper is positioned on a rear side of the cleaning head and is configured to receive waste discharged from the cleaning head during the surface sweeping operations. The hopper lift is configured to raise the waste hopper from an operating position, in which the waste hopper is positioned adjacent the cleaning head, to a dumping position, in which the waste hopper is positioned to dump waste collected in the waste hopper. In one embodiment, the vacuum squeegee is attached to the hopper lift. Also disclosed is a method of cleaning a surface using embodiments of the machine.

U.S. Pat. No. 7,269,877 appears to disclose a floor care appliance that includes a microprocessor based control arrangement having a communications port for connection to a computer. Once connected to a computer, software updates for the microprocessor may be downloaded or diagnostic information stored in the microprocessor's memory may be uploaded for diagnostic purposes. In one embodiment, the communication port is configured to be connected to a local computer for possible further connection to a remote computer over a computer or telephone network. In an alternate embodiment, the communication port is configured to connect to and dial up a remote computer over a telephone network.

U.S. Pat. No. 7,199,711 appears to disclose a method of communicating data from a mobile floor cleaner to a remote receiver a data communication is initiated from a communicator of the mobile floor cleaner to the remote receiver and data is communicated to the remote receiver with the communicator.

U.S. Pat. No. 5,265,300 appears to disclose a floor scrubbing vehicle having scrub brushes mounted at the rear of the vehicle by a mechanism which allows both the brushes and squeegee to extend and retract transversely with respect to the vehicle. The mechanism is resilient, and allows the scrub brushes and squeegee to automatically retract inward upon contact with an immovable obstacle, and also causes automatic extension of the brushes and squeegee following passage of the obstacle. The scrub brushes and squeegee are mounted in a scrubbing pod frame which can rotate about a vertical axis with respect to the vehicle to prevent damage, or to facilitate access for repair and maintenance.

U.S. Pat. No. 5,239,720 appears to disclose a surface cleaning machine as a combination sweeping-scrubbing apparatus including a sweeping brush for sweeping debris into a hopper and a one piece squeegee for picking up solution after four staggered, disc brushes. The squeegee is U-shaped having a longitudinal extent greater than that of the disc brushes located intermediate the legs of the squeegee. The drive wheel is located in front of the disc brushes, the squeegee and the solution applying means. The squeegee is raised and lowered relative to the frame by an actuator which pivots an L-shaped member, the leg of which abuts against and pivots a lever interconnected to the mount or the squeegee by a turnbuckle. The hopper is raised and simultaneously tilted by a single cylinder which pivots the upper arm of a parallelogram including a lower arm. The hopper is pivotally mounted to an end of a hopper arm, the opposite end of which is pivotally mounted to the end of the upper arm, and is further pivotally mounted to the end of the lower arm. The hopper is simultaneously tilted at a generally constant dump angle as the hopper is raised from a lowered position in a horizontal debris collecting condition to a raised position with the hopper in a dumping condition.

U.S. Pat. No. 5,093,955 appears to disclose a combination floor sweeping and scrubbing machine which is as compact and maneuverable as an equivalent machine which only sweeps or scrubs, while retaining typical hopper and tank volumes. Its operator can change it from sweeping to scrubbing or vice versa at any time by moving a few controls and without adding or removing any parts. It has one debris hopper and one horizontal cylindrical rotating brush and they function in both the sweeping and scrubbing modes. A vacuum system supplies dust control during sweeping and vacuum pickup of dirty solution during scrubbing. In the scrubbing mode a single tank supplies scrubbing solution and receives dirty solution picked up from the floor.

U.S. Pat. No. 4,831,684 appears to disclose a self-propelled sweeper vehicle that has front steerable wheels mounted on a centrally pivoted axle assembly which also carries the nozzle and brush gear whereby these assemblies are steered in unison with the vehicle. The nozzle front edge is convex and promotes non-turbulent air intake. The nozzle is formed as a hollow rotationally molded structure of a plastics material having inherent structural strength and stiffness. The brush gear is mounted on linkages comprising inner and outer portions pivotally connected for folding movement to resiliently yield under impact. The brush covers are formed as hollow plastics moldings and part of the brush support structure.

U.S. Pat. No. 4,819,676 appears to disclose a machine and/or system as well as a method of operation and an assembly whereby a sweeping unit may be quickly converted into a scrubbing unit and vice versa. The system is capable of operation either in a sweeping mode or a scrubbing mode and is also adaptable to include a vacuum wand assembly when the unit is to be operated in its sweeping mode.

U.S. Pat. No. 4,716,621 appears to disclose a sweeper machine for floors and bounded surfaces, e.g. the floors of workshops and warehouses, courtyards, having engaged with the machine frame, a removable container for collecting the swept trash supported by pivotally-mounted guides engaged by swivel members extending in a crosswise direction to the machine's longitudinal axis and cooperating to define a small frame intervening sealingly between a suction assembly in the frame and a suction mouth of the container, and with snap-action hook-up elements provided between the frame and the pivotally mounted guides and spring members projecting from the frame and acting by spring contact on the container.

U.S. Pat. No. 4,667,364 appears to disclose a floor cleaning machine which the fresh water and product dosing operation is controlled as a function of the operation of the driving motor such that the dosing per unit of floor area is maintained at an operator-controllable level. Improved economy of water, product and energy is achieved.

U.S. Pat. No. 4,580,313 appears to disclose a walk behind floor maintenance machine that includes a filter and filter housing that may be pivoted away to permit removal of the debris hopper. The filter may be cleaned by vibrating the filter and filter housing. Dust vibrated from the filter slides into the hopper. The hopper may be manually removed for emptying.

European Patent Number 2,628,427 A2 appears to disclose a device which has a suction motor and a dust collecting chamber arranged in a suction housing. A suction device-communication unit communicates with external communication units that form a component of a hand-held power tool. The external communication units are operated at a distance to the housing in connection with the tool. The suction device-communication unit includes a suction device transmitter for transmitting a control signal and/or a status signal to the external communication units. An independent claim is also included for an external communication unit for cooperation with a hand-held power tool.

While the above-identified patents and/or publications do appear to disclose various floor cleaning machines and associated systems, their configurations remain non-desirous, incompatible, and/or problematic inasmuch as, among other things, none of the above-identified floor cleaning machines and associated systems appear to include assemblies having intelligent systems that have the capacity to selectively gather, obtain, monitor, store, record, and analyze data associated with components of the floor cleaning machines and controllably communicate and disseminate such data with other systems and users. Furthermore, none of the above-identified floor cleaning machines and associated systems appear to utilize and/or be compatible with intelligent systems associated with secondary electrochemical cell sub-assemblies.

It is therefore an object of the disclosed technology to provide floor cleaning machines having intelligent systems that have the capacity to selectively gather, obtain, monitor, store, record, and analyze data associated with components of the floor cleaning machines and controllably communicate and disseminate such data with other systems and users, as well as provide floor cleaning machines that are compatible with secondary electrochemical cells having intelligent systems associated therewith.

These and other objects of the disclosed technology will become apparent in light of the present specification, claims, and appended drawings.

BRIEF DESCRIPTION OF THE DRAWINGS

Certain embodiments are illustrated by the accompanying figures. It will be understood that the figures are not necessarily to scale and that details not necessary for an understanding of the disclosed technology or that render other details difficult to perceive may be omitted. It will be further understood that the disclosed technology is not necessarily limited to the particular embodiments illustrated herein.

The disclosed technology will now be described with reference to the drawings wherein:

FIG. 13A of the drawings is a wiring diagram of a floor cleaning machine fabricated in accordance with some embodiments using a frame and wheel subassembly;

FIG. 13B of the drawings is a wiring diagram of another floor cleaning machine fabricated in accordance with some embodiments using a frame and transaxle sub-assembly;

SUMMARY

Figure 1:
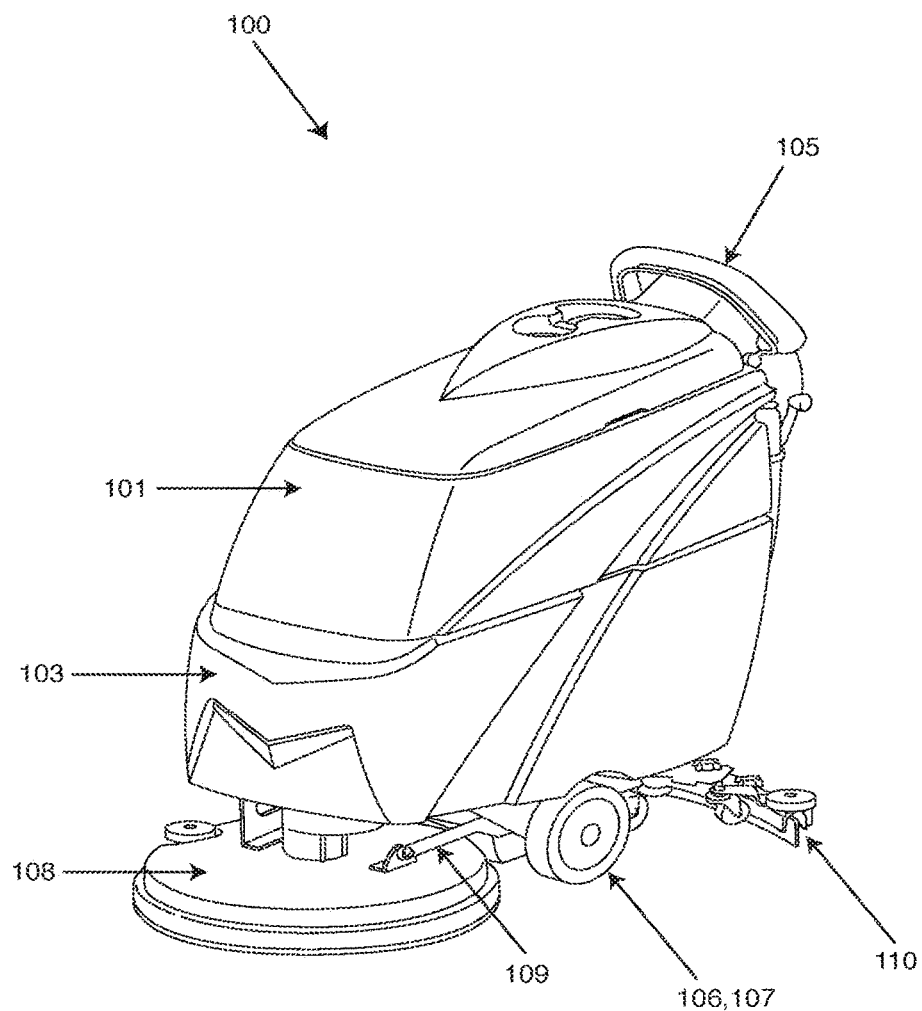
FIG. 1 of the drawings is a front perspective view of a floor cleaning machine fabricated in accordance with some embodiments.

The disclosed technology is directed to, in one embodiment, a floor cleaning machine having an intelligent system comprising, consisting essentially of, and/or consisting of: (1) a recovery tank sub-assembly; (2) a vacuum fan sub-assembly; (3) a solution tank sub-assembly, wherein the solution tank sub-assembly preferably comprises a secondary electrochemical cell; (4) a solution flow sub-assembly; (5) a control console sub-assembly; (6) at least one of a frame and wheel sub-assembly and a frame and transaxle sub-assembly; (7) a scrub head sub-assembly; (8) a scrub head lift sub-assembly; (9) a squeegee sub-assembly; and (10) an intelligent system associated with at least one of the above-identified sub-assemblies, wherein the intelligent system at least one of selectively gathers, obtains, monitors, stores, records, and analyzes data associated with components of the floor cleaning machine assembly, and at least one of controllably communicates and disseminates such data with at least one of another system and user.

The disclosed technology is also directed to, in one embodiment, a subassembly having an intelligent system for a floor cleaning machine, comprising, consisting essentially of, and/or consisting of: (1) a primary and/or secondary electrochemical cell; and (2) an intelligent system, wherein the intelligent system at least one of selectively gathers, obtains, monitors, stores, records, and analyzes data associated with components of the floor cleaning machine assembly, and at least one of controllably communicates and disseminates such data with at least one of another system and user.

The disclosed technology is additionally directed to, in one embodiment, a method for using an intelligent system with a floor cleaning machine assembly comprising, consisting essentially of, and/or consisting of the steps of: (1) providing a floor cleaning machine assembly having an intelligent system; (2) selectively gathering, obtaining, monitoring, storing, recording, and/or analyzing data associated with components of the floor cleaning machine assembly; and (3) controllably communicating and/or disseminating data with at least one of another system and user.

The present disclosure relates generally to robot and/or machine management and, more particularly, to systems and methods for controlling and supervising a plurality of robots and/or machines using one or more servers. The present disclosure provides, in multiple aspects and embodiments, an interconnected network of robots and/or machines that can be individually managed, tracked, and serviced/maintained with the aid of one or more central servers. The one or more central servers can interface seamlessly with various business or financial applications or sub-systems to collectively enable a flexible business solution for managing robots and/or machines, coordinating logistics of machine repair, service, or maintenance, and tracking financial information or transactional data associated with the usage or the operation of the robots and/or machines.

The present disclosure addresses various limitations and shortcomings of conventional fleet management systems by providing systems and methods for managing multiple robots and/or machines in parallel based on the operational data obtained for each respective robot and/or machine and/or the operational data collectively obtained from multiple robots and/or machines (e.g., a plurality of robots and/or machines in a fleet). Unlike other commercially available systems, the presently disclosed fleet management systems may intelligently coordinate and prioritize maintenance or repair of robots, machines, or robot/machine components based on robot/machine operational data or component operational data. In some cases, the fleet management systems disclosed herein may provide a streamlined user experience allowing operators to easily scan codes associated with a faulty robot or machine or component to initiate a repair or maintenance procedure. In some cases, the fleet management systems disclosed herein may also seamlessly interface with other applications or sub-systems to permit tracking of robot or machine usage and repair or maintenance procedures. In some cases, the fleet management systems disclosed herein may be configured to control an operation of one or more robots and/or machines based on the operational data for the one or more robots and/or machines, or based on financial information associated with a usage or an operation of the one or more robots and/or machines.

The systems and methods of the present disclosure may be implemented to enable real time fleet management for a plurality of robots and/or machines. In one aspect, the present disclosure provides a system for fleet management. The system may comprise one or more servers configured to execute a method for managing one or more robots and/or machines. In some cases, the one or more robots may comprise a plurality of robots and/or machines forming a fleet or a swarm.

In one aspect, the method may comprise (a) receiving and processing operational data corresponding to an operation or a status of one or more robots and/or machines at a central server that is in communication with the one or more robots and/or machines, wherein the processing of the operational data comprises comparing (i) the operational data to (ii) one or more reference values or thresholds associated with the operation or the status of the one or more robots and/or machines or one or more components of the one or more robots and/or machines; (b) detecting, based at least in part on the comparison in (a), one or more changes or deviations in operation or expected behavior for the one or more robots and/or machines or the one or more components of the one or more robots and/or machines, wherein the one or more changes or deviations indicate or identify at least one robot, machine, or component to be serviced, maintained, or replaced; and (c) generating and transmitting one or more maintenance or repair instructions for the at least one robot, machine, or component based at least in part on a priority of maintenance associated with the at least one robot, machine, or component.

In some embodiments, (c) further comprises prioritizing the one or more maintenance or repair instructions or adjusting the priority of maintenance based on the operational data. In some embodiments, (c) further comprises prioritizing the one or more maintenance or repair instructions or adjusting the priority of maintenance based on a condition or a state of the at least one component to be serviced or replaced. In some embodiments, (c) further comprises prioritizing the one or more maintenance or repair instructions or adjusting the priority of maintenance based on a level or a severity of component wear or breakdown.

In some embodiments, the method may further comprise, prior to (a), providing one or more scannable codes that are associated with or affixable to the one or more robots and/or machines or the one or more components of the one or more robots and/or machines. In some embodiments, the method may further comprise, subsequent to (b), assigning one or more entities to service or maintain the at least one robot, machine, or component based at least in part on the one or more changes or deviations detected in (b). In some embodiments, the one or more entities comprise one or more maintenance or service technicians.

In some embodiments, the method may further comprise identifying or locating a service history for the one or more robots and/or machines or the one or more components of the one or more robots and/or machines when a user or an operator of the one or more robots and/or machines scans the one or more scannable codes. In some embodiments, the one or more scannable codes comprise one or more robot-specific, machine-specific or component-specific codes that are unique to the one or more robots and/or machines or the one or more components of the one or more robots and/or machines. In some embodiments, the one or more scannable codes comprise a bar code, a quick response (QR) code, an April tag, a unique identifier, or a serial number.

In some embodiments, the operational data comprises information on a battery level or a charge status of the one or more robots and/or machines and/or the one or more components of the one or more robots and/or machines. In some embodiments, the operational data comprises fault information or alarm information for the one or more robots and/or machines and/or the one or more components of the one or more robots and/or machines. In some embodiments, the fault information is generated automatically by the one or more robots and/or machines. In some embodiments, the fault information is manually reported or generated by a user or an operator of the one or more robots and/or machines. In some embodiments, the operational data comprises information on work records, a cleaning path, or a cleaning performance for the one or more robots and/or machines. In some embodiments, the operational data comprises a total time of use or operation for the one or more components. In some embodiments, the operational data is periodically generated or compiled by the one or more robots and/or machines for transmission or upload to the central server. In some embodiments, the operational data is transmitted from the one or more robots and/or machines to the central server at one or more predetermined or periodic time intervals. In some embodiments, the operational data is transmitted from the one or more robots and/or machines to the central server at one or more time intervals that vary according to a historical usage or a total operational time of the one or more robots and/or machines.

In some embodiments, the one or more reference values or thresholds correspond to a total operational time for the one or more robots and/or machines or the one or more components of the robots or machines. In some embodiments, the total operational time is determined separately for each component of a robot and/or machine.

In some embodiments, the method may further comprise, subsequent to (b), adjusting an operation of the one or more robots and/or machines to compensate for or mitigate a suboptimal performance or operation of the at least one robot, machine, or component experiencing the one or more changes or deviations. In some embodiments, the method may further comprise, subsequent to (c), tracking and providing maintenance or service status information to a user or an operator of the one or more robots and/or machines. In some embodiments, tracking and providing maintenance or service status information comprises estimating an amount of time needed to maintain, repair, or service the at least one robot, machine, or component.

In some embodiments, (c) further comprises prioritizing the one or more maintenance or repair instructions or adjusting the priority of maintenance based on the estimated amount of time needed to maintain, repair, or service the at least one robot, machine, or component in order to reduce robot or machine downtime and maximize robot operational time. In some embodiments, the method may further comprise, subsequent to (c), providing or ordering a replacement robot or machine or one or more replacement components for a user or an operator of the one or more robots and/or machines experiencing the one or more changes or deviations. In some embodiments, the method may further comprise, subsequent to (c), adjusting the priority of maintenance for the at least one robot, machine, or component based on (i) additional operational data received for the at least one robot, machine, or component and/or (ii) additional operational data received for another robot, machine, or component. In some embodiments, the method may further comprise, subsequent to (c), adjusting one or more motion paths or cleaning routines for the one or more robots and/or machines based on the one or more changes or deviations detected in (b). In some embodiments, the one or more changes or deviations comprise one or more faults or failures for the one or more robots and/or machines or the one or more components of the one or more robots and/or machines.

In some embodiments, (c) further comprises transmitting the one or more maintenance or repair instructions to the central server. In some embodiments, the central server is configured to provide one or more software updates to the one or more robots and/or machines to address or mitigate the one or more changes or deviations detected in (b). In some embodiments, (c) further comprises transmitting the one or more maintenance or repair instructions to a repair or maintenance station.

In some embodiments, the one or more robots and/or machines are configured to autonomously travel to and/or interface with the repair or maintenance station in order to receive or undergo one or more repair, maintenance, or service operations. In some embodiments, the one or more maintenance or repair instructions are generated based on one or more pictures or videos provided from a user or an operator of the one or more robots and/or machines to the central server. In some embodiments, the one or more pictures or videos may indicate or show the one or more changes or deviations in operation or expected behavior for the one or more robots and/or machines or the one or more components of the one or more robots and/or machines. In some embodiments, the one or more maintenance or repair instructions are generated based on (i) robot, machine, or component data collected by the one or more robots and/or machines using one or more sensors and/or (ii) one or more predetermined parameters associated with the robot, machine, or component data. In some embodiments, the robot, machine, or component data may comprise information on battery level or usage, motor temperature, or current and voltage levels for the one or more robots and/or machines or the one or more components of the one or more robots and/or machines.

In some embodiments, the method may further comprise, subsequent to (b), scheduling one or more service appointments for the one or more robots and/or machines based on (i) the operational data and/or (ii) a user request to schedule one or more service or maintenance sessions. In some embodiments, the one or more robots and/or machines comprise a cleaning robot or machine, an autonomous vehicle, a rover, a drone, a shuttle for transporting humans or objects, or a humanoid robot or machine. In some embodiments, the one or more robots and/or machines are configured to operate in an indoor environment or a building. In some embodiments, the one or more robots and/or machines are configured to operate in and around peripheral areas of a building. In some embodiments, the one or more robots and/or machines are configured to operate in an outdoor environment. The outdoor environment may be external to a building. The outdoor environment may include, for example, private roads and/or public roads.

In some embodiments, the central server is configured to instruct the one or more robots and/or machines to automatically shut down or restrict a performance of one or more tasks or services when a customer renting or leasing the one or more robots misses a payment deadline.

In some embodiments, the method may further comprise managing or updating a customer account associated with the one or more robots and/or machines based on the operational data processed in (a), the one or more changes or deviations in operation or expected behavior detected in (b), or the one or more maintenance or repair instructions generated in (c). In some embodiments, the method may further comprise managing or updating financial information, payment information, or billing information associated with the one or more robots and/or machines based on the operational data processed in (a), the one or more changes or deviations in operation or expected behavior detected in (b), or the one or more maintenance or repair instructions generated in (c).

In some embodiments, the central server is configured to calculate and report a usage time for the one or more robots and/or machines and/or the one or more components of the one or more robots when a service or maintenance technician scans the one or more scannable codes.

In some embodiments, the one or more robots and/or machines comprise one or more position sensors for sensing a position and/or an orientation of the one or more robots and/or machines. In some embodiments, the operational data comprises information on the position and/or the orientation of the one or more robots and/or machines.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

DETAILED DESCRIPTION

While various embodiments of the disclosed technology have been shown and described herein, it will be obvious to those skilled in the art that such embodiments are provided by way of example only. Numerous variations, changes, and substitutions may occur to those skilled in the art without departing from the disclosed technology. It should be understood that various alternatives to the embodiments described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

While this disclosed technology is susceptible of embodiment in many different forms, there is shown in the drawings and will be described herein in detail, one or more specific embodiments with the understanding that the present disclosure is to be considered as an exemplification of the principles of the disclosed technology and is not intended to limit the disclosed technology to the embodiments illustrated.

It will be understood that like or analogous elements and/or components, referred to herein, may be identified throughout the drawings with like reference characters.

It will be further understood that FIGS. 1-18 are merely representations and/or illustrations of floor cleaning machines and their associated sub-assemblies. As such, some of the components may be distorted from their actual scale for pictorial clarity and/or image enhancement.

Unless otherwise specified, the machines, sub-assemblies, components and/or parts provided herein below are commercially available from International Cleaning Equipment (ICE) (Guangdong, China) or a subsidiary thereof.

Figure 2:
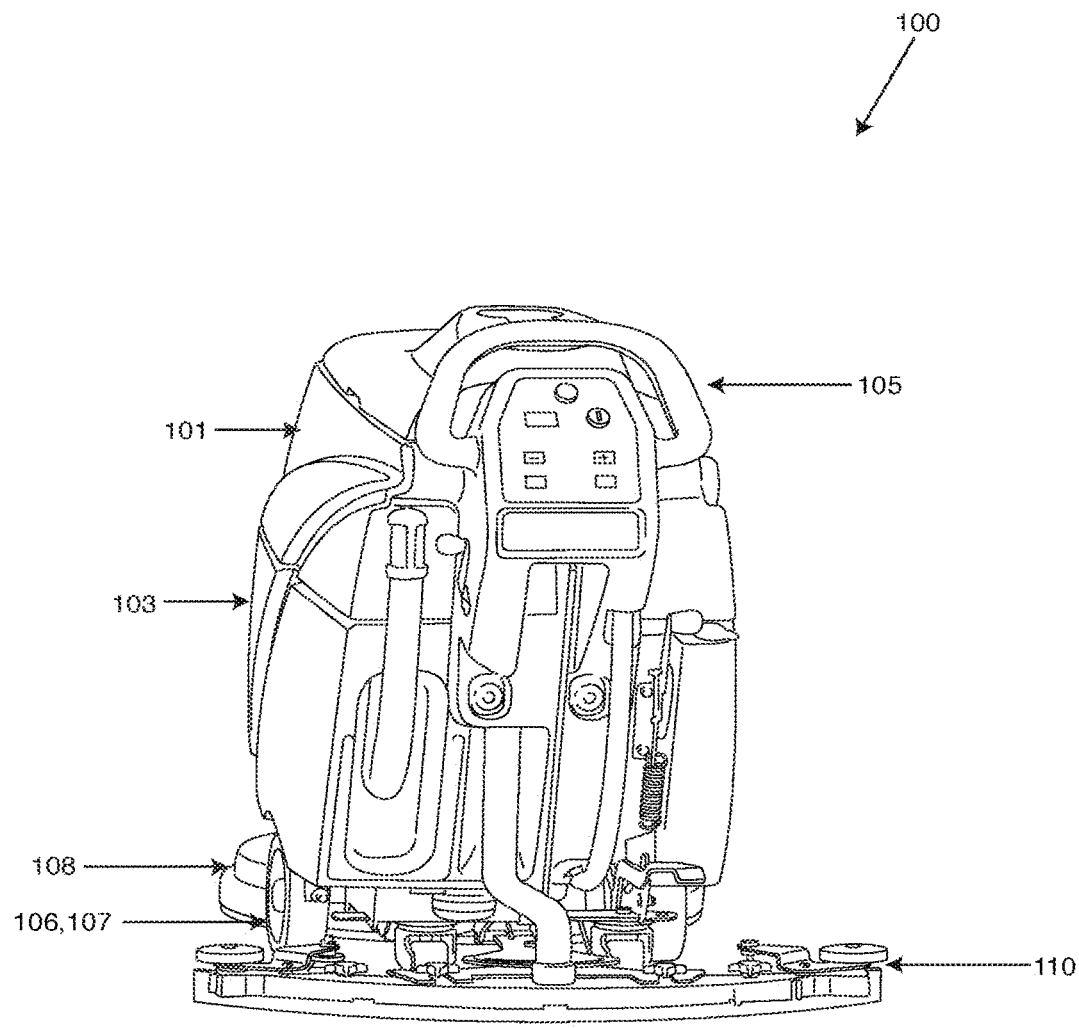
FIG. 2 of the drawings is a rear perspective view of a floor cleaning machine fabricated in accordance with some embodiments.
Figure 3:
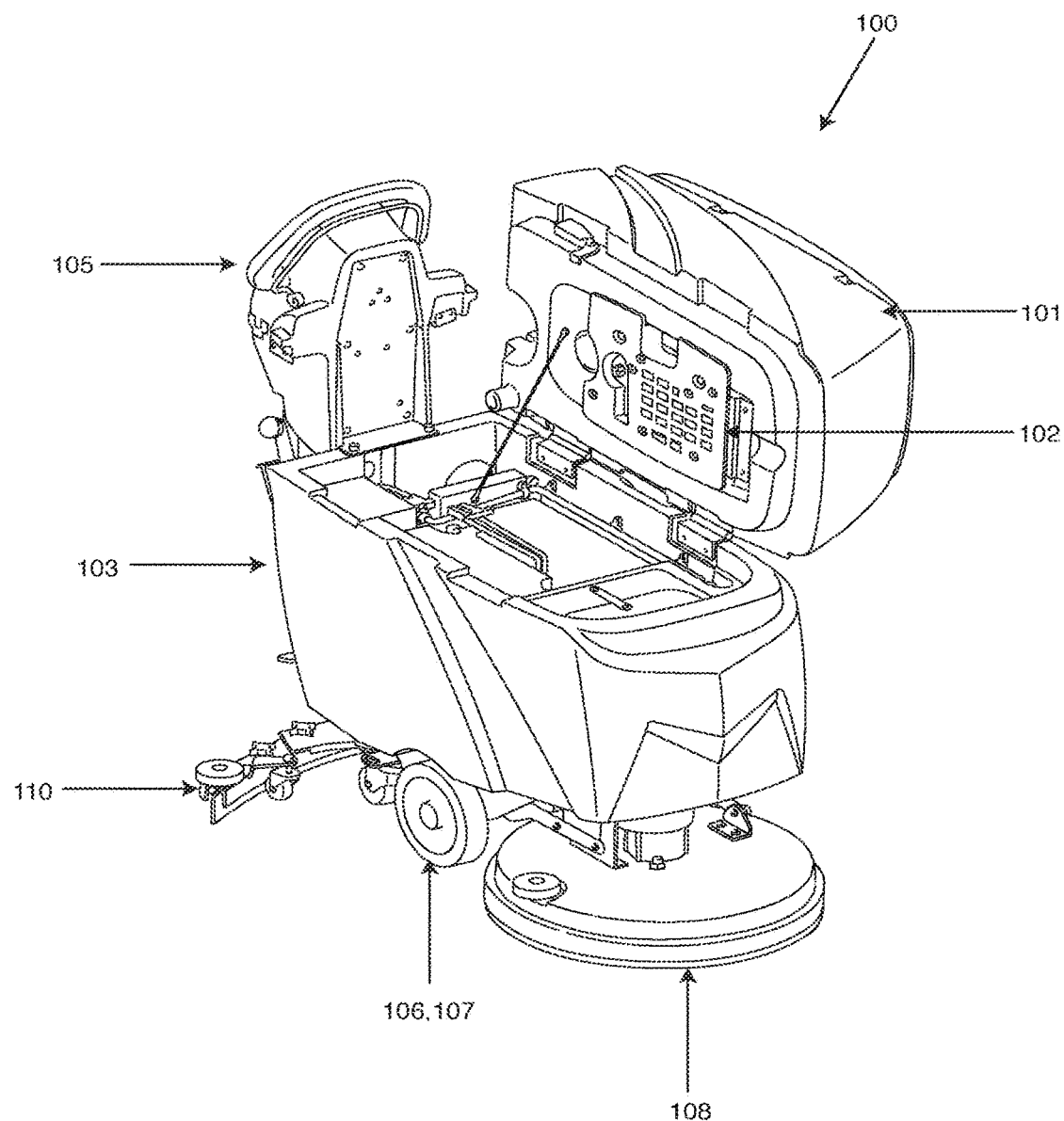
FIG. 3 of the drawings is a front perspective view of a floor cleaning machine fabricated in accordance with some embodiments having an intelligent system integrated with a secondary electrochemical cell positioned within the solution tank sub-assembly.

Referring now to the drawings, and to FIGS. 1-3 in particular, perspective views of floor cleaning machine 100 having an intelligent system are shown. Preferably, floor cleaning machine 100 comprises recovery tank sub-assembly 101 (FIG. 4), vacuum fan sub-assembly 102 (FIG. 5), solution tank sub-assembly 103 (FIG. 6), solution flow sub-assembly 104 (FIG. 7), control console sub-assembly (FIG. 8), frame and wheel sub-assembly 106 (FIG. 9A) or frame and transaxle sub-assembly 107 (FIG. 9B), scrub head sub-assembly 108 (FIG. 10), scrub head lift sub-assembly 109 (FIG. 11), squeegee sub-assembly 110 (FIG. 12) and, as will be discussed in greater detail herein below, an intelligent system associated with one or more of the above-identified sub-assemblies, wherein the intelligent system selectively gathers, obtains, monitors, stores, records, and/or analyzes data associated with components of floor cleaning machine 100, and controllably communicates and/or disseminates such data with another system and/or user.

Figure 4:
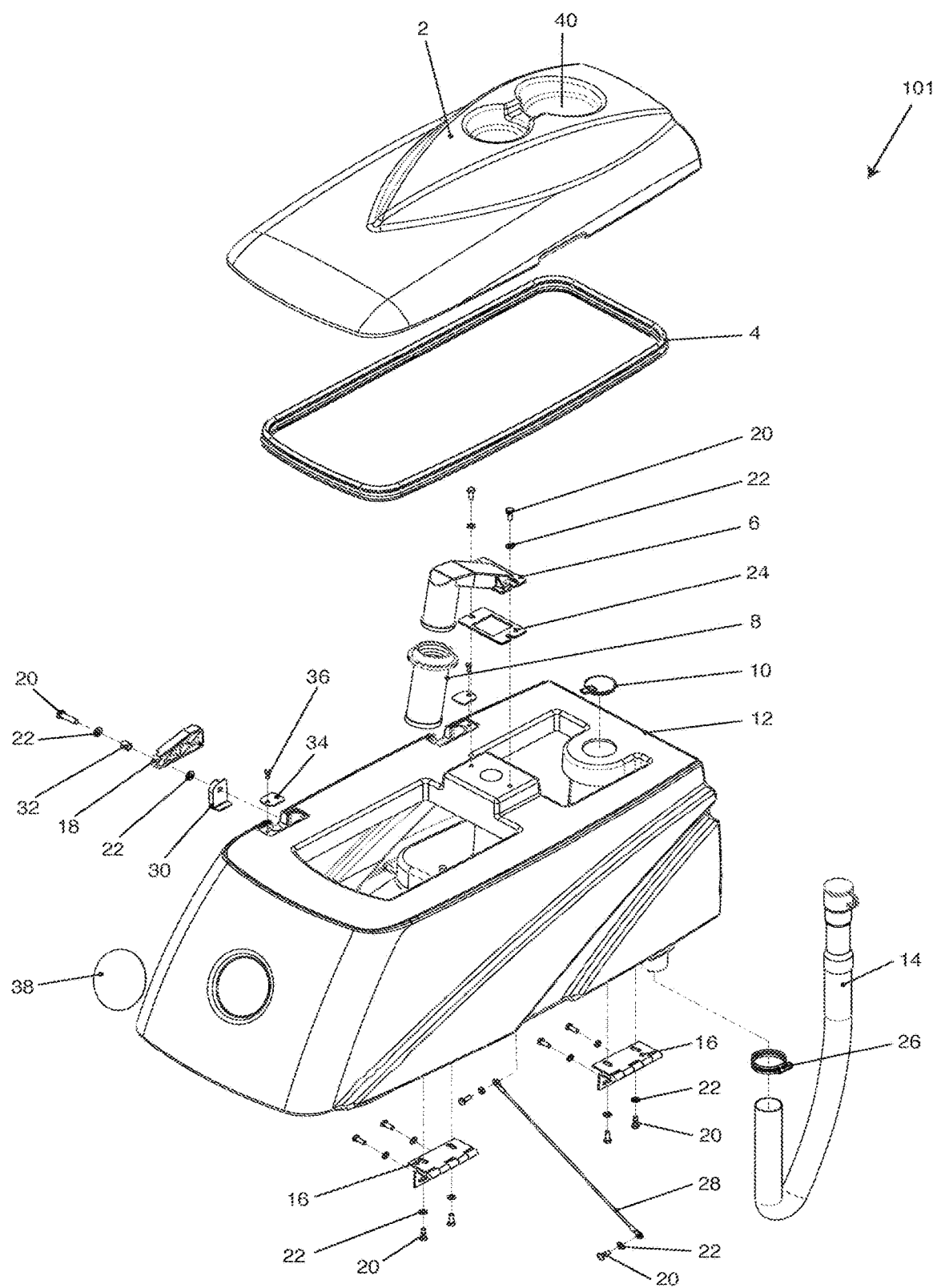
FIG. 4 of the drawings is an exploded isometric view of a recovery tank sub-assembly fabricated in accordance with some embodiments.

Referring now to FIG. 4, in some embodiments, recovery tank sub-assembly 101 generally forms the upper portion of the body of floor cleaning machine 100. Recovery tank sub-assembly 101 preferably comprises recovery tank cover 2, recovery tank cover seal 4, float adapter 6, shut-off float 8, cap 10, recovery tank housing or body 12 for containing recovered solution, dirt, and/or debris, drain hose 14, hinge assembly 16 for releasable securement to solution tank sub-assembly 103, and recovery tank support 18.

As is also shown in FIG. 4, recovery tank sub-assembly 101 utilizes a plurality of conventional bolts 20, washers 22, gaskets 24, clamps 26, cables 28, brackets 30, sleeves 32, plates 34, and screws 36 for assembly and use of recovery tank sub-assembly 101.

Recovery tank sub-assembly 101 also preferably includes front indicia or logo 38 for product recognition and cup holder 40 for containing a cup, can, and/or bottle.

Figure 5:
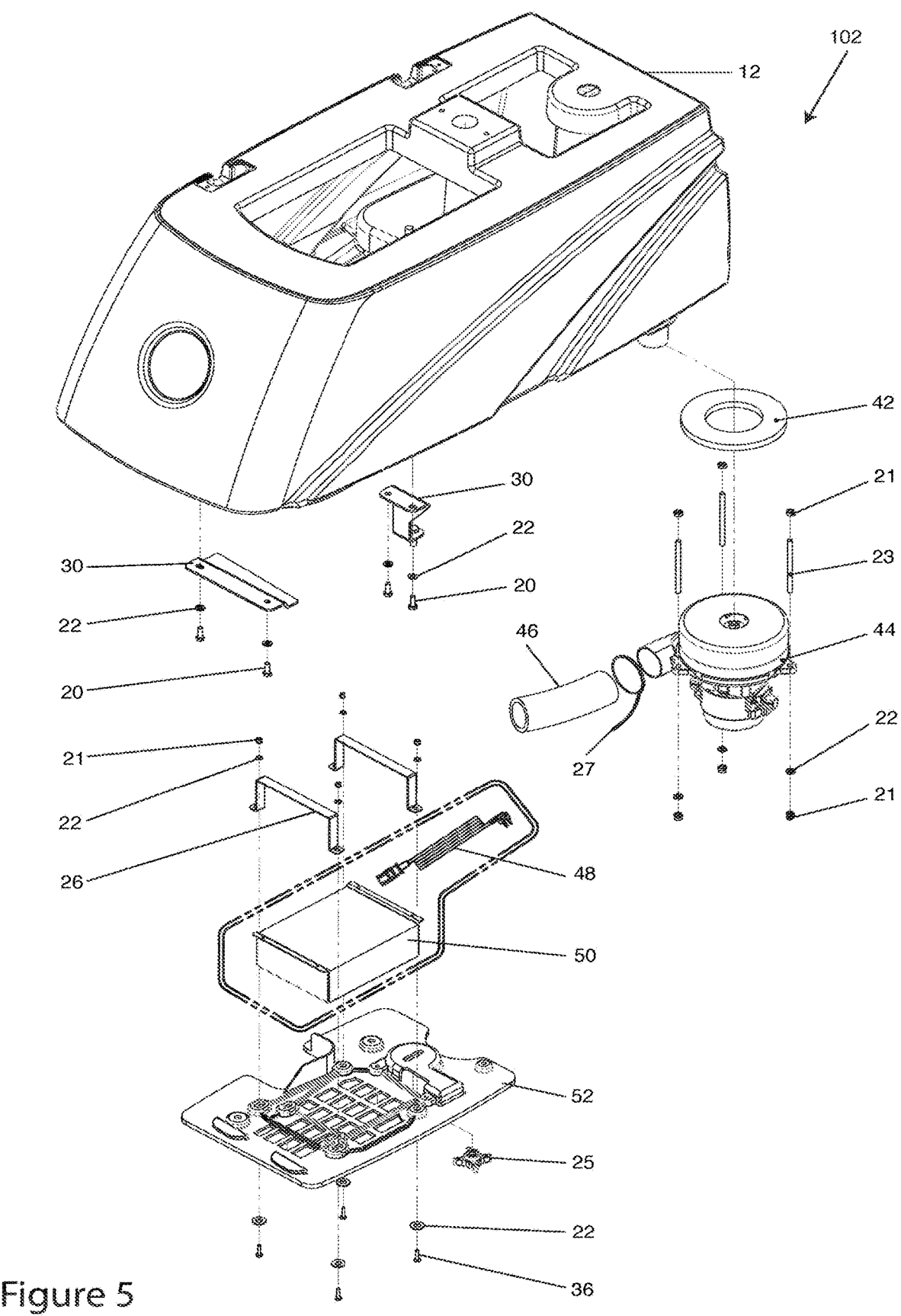
FIG. 5 of the drawings is an exploded isometric view of a vacuum fan sub-assembly fabricated in accordance with some embodiments.

Referring now to FIG. 5, in some embodiments, vacuum fan sub-assembly 102 is positioned generally proximate the bottom portion of recovery tank sub-assembly 101. Vacuum fan sub-assembly 102 preferably comprises vacuum motor gasket 42, vacuum motor 44 (e.g., two-stage 24V DC 500 W), vacuum motor muffler 46, battery charger power cord 48, optional on-board battery charger 50, and charger cover 52.

As is also shown in FIG. 5, vacuum fan sub-assembly 102 utilizes a plurality of conventional bolts 20, nuts 21, washers 22, studs 23, knobs 25, clamps 26, ties 27 (e.g., nylon ties), brackets 30, and screws 36 for assembly and use of vacuum fan sub-assembly 102.

Figure 6:
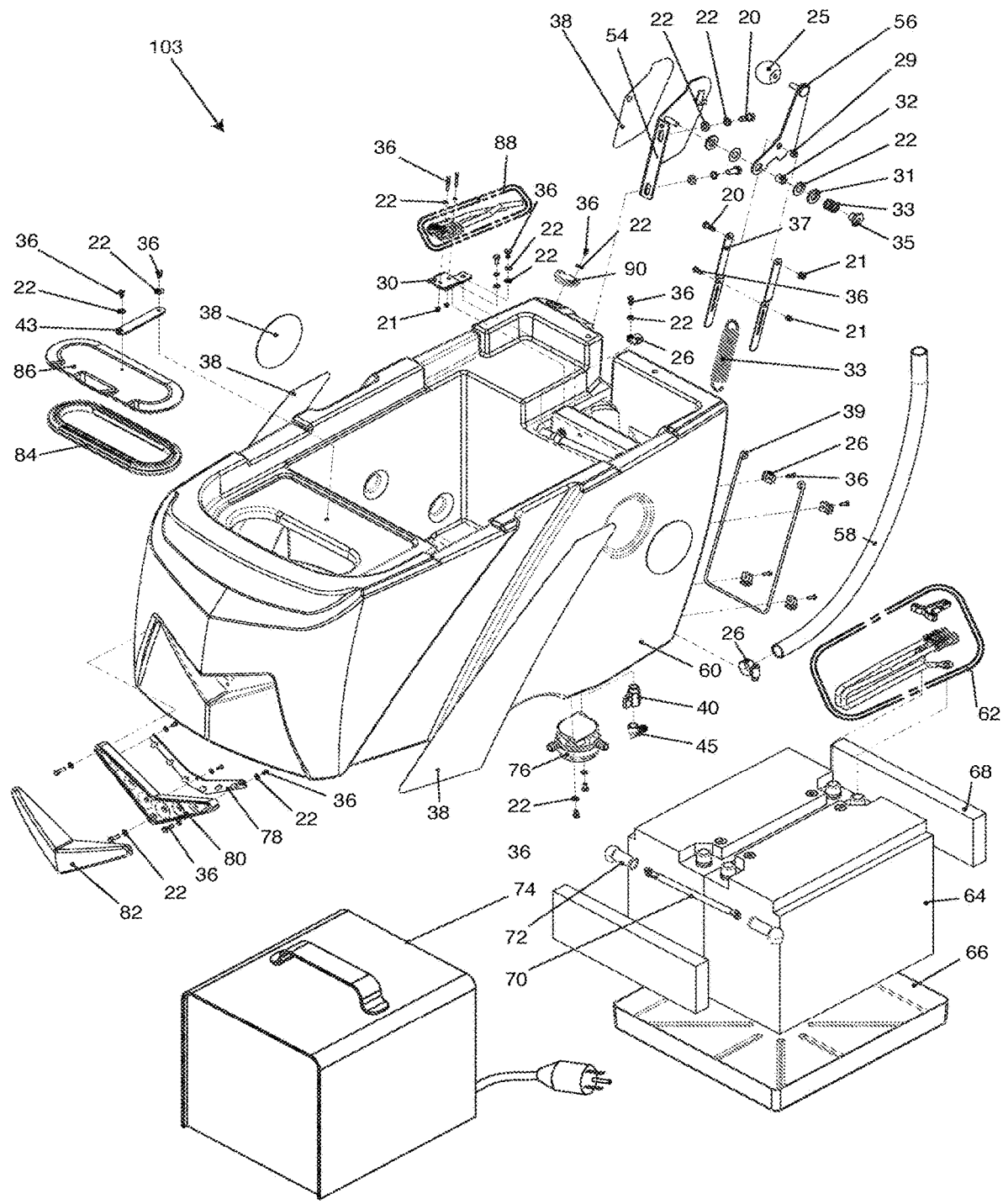
FIG. 6 of the drawings is an exploded isometric view of a solution tank sub-assembly fabricated in accordance with some embodiments.

Referring now to FIG. 6, in some embodiments, solution tank sub-assembly 103 generally forms the lower portion of the body floor cleaning machine 100. Solution tank sub-assembly 103 preferably comprises down pressure lever bracket 54, down pressure lever 56, clean tubing 58, solution tank 60, battery connect cable assembly 62, battery 64, battery tray 66, battery spacers 68, battery connect cable 70, battery terminal cover 72, optional off-board battery charger 74, filter assembly 76, indicia/logo 38, LED light 78, LED light mounting base 80, LED light cover 82, seal member 84, cover member 86, battery connect cable assembly 88, and solution fill cap 90.

In accordance with the disclosed technology, battery 64 preferably comprises a secondary electrochemical cell, such as a lead acid, NiCad, NiMH, and/or lithium-ion battery. Preferred examples of lithium-ion batteries include lithium cobalt oxide ($LiCoO_2$) batteries, lithium manganese oxide ($LiMn_2O_4$) batteries, lithium nickel manganese cobalt oxide ($LiNiMnCoO_2$) batteries, lithium iron phosphate ($LiFePO_2$) batteries, lithium nickel cobalt aluminum oxide ($LiNiCoAlO_2$) batteries, and lithium titanate ($Li_4Ti_5O_{12}$) batteries. In one embodiment each battery 64 comprises an anode, a cathode, and an electrolyte, wherein at least one of the anode, cathode, and electrolyte are monitored by the intelligent system of the floor cleaning machine's intelligent system. Such monitoring comprises evaluating the structural integrity of the anode, the cathode, and/or the electrolyte, and/or the cycle life of each component—including electrolyte level.

As is also shown in FIG. 6, solution tank sub-assembly 103 utilizes a plurality of conventional bolts 20, nuts 21, washers 22, clamps 26, bushings 29, plates/brackets 30, thrust bearings 31, sleeves 32, springs 33, spring retainers 35, screws 36, spring links 37, indicia/logos/labels 38, netting 39, ball valves 41, straps 43, and elbows 45 for assembly and use of solution tank sub-assembly 103.

Figure 7:
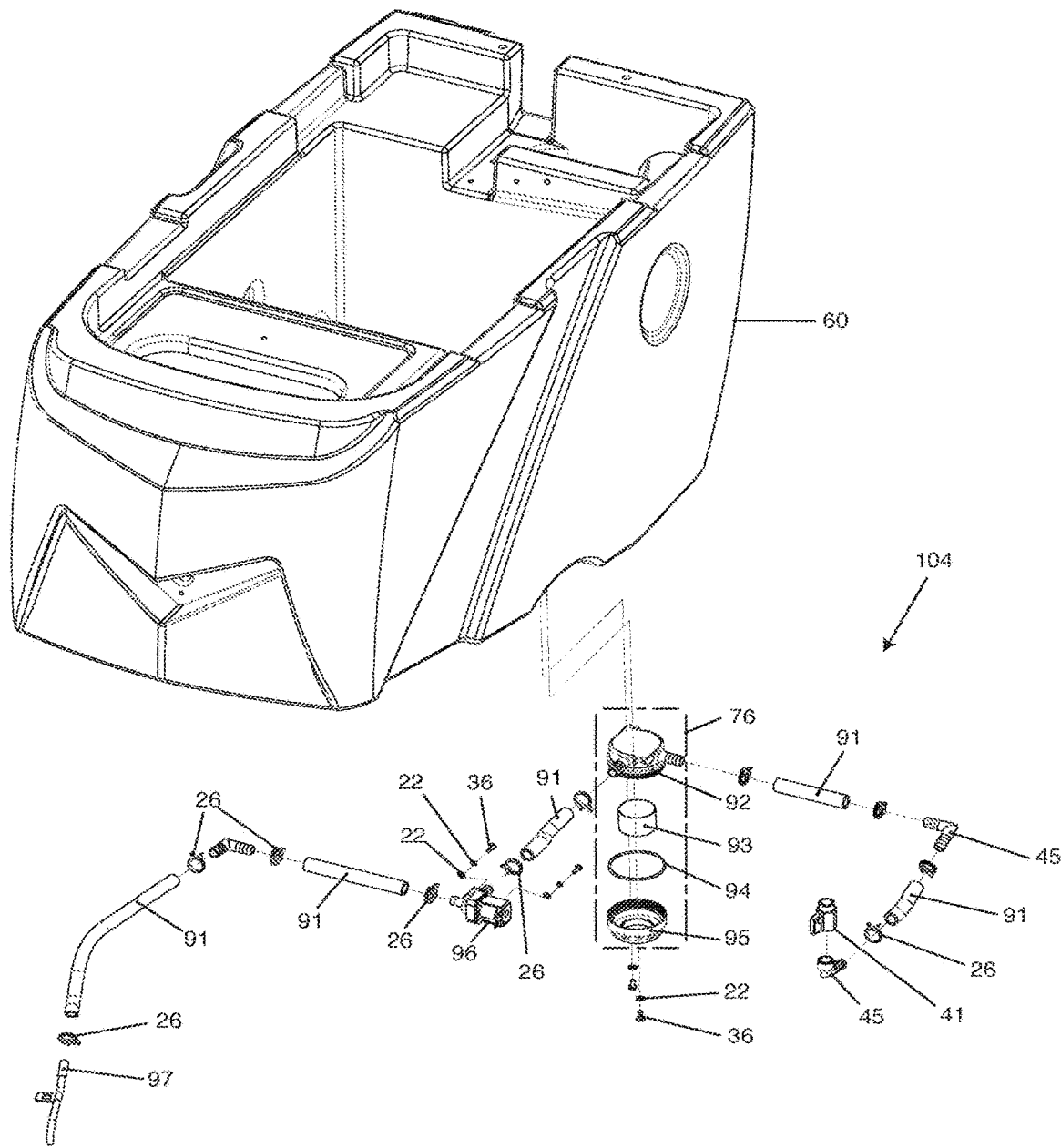
FIG. 7 of the drawings is an exploded isometric view of a solution flow sub-assembly fabricated in accordance with some embodiments.

Referring now to FIG. 7, in some embodiments, solution flow sub-assembly 104 is positioned generally proximate the lower portion of solution tank sub-assembly 103. Solution flow sub-assembly 104 preferably comprises elbows 45, ball valve 41, clamps 26, tubing 91, filter assembly 76 from solution tank sub-assembly 103 (filter assembly 76 includes filter assembly base 92, filter screen 93, o-ring 94, and cap 95), washers 22, solenoid valve 96 (e.g., 24V DC), screws 36, and water supply tube 97.

Figure 8:
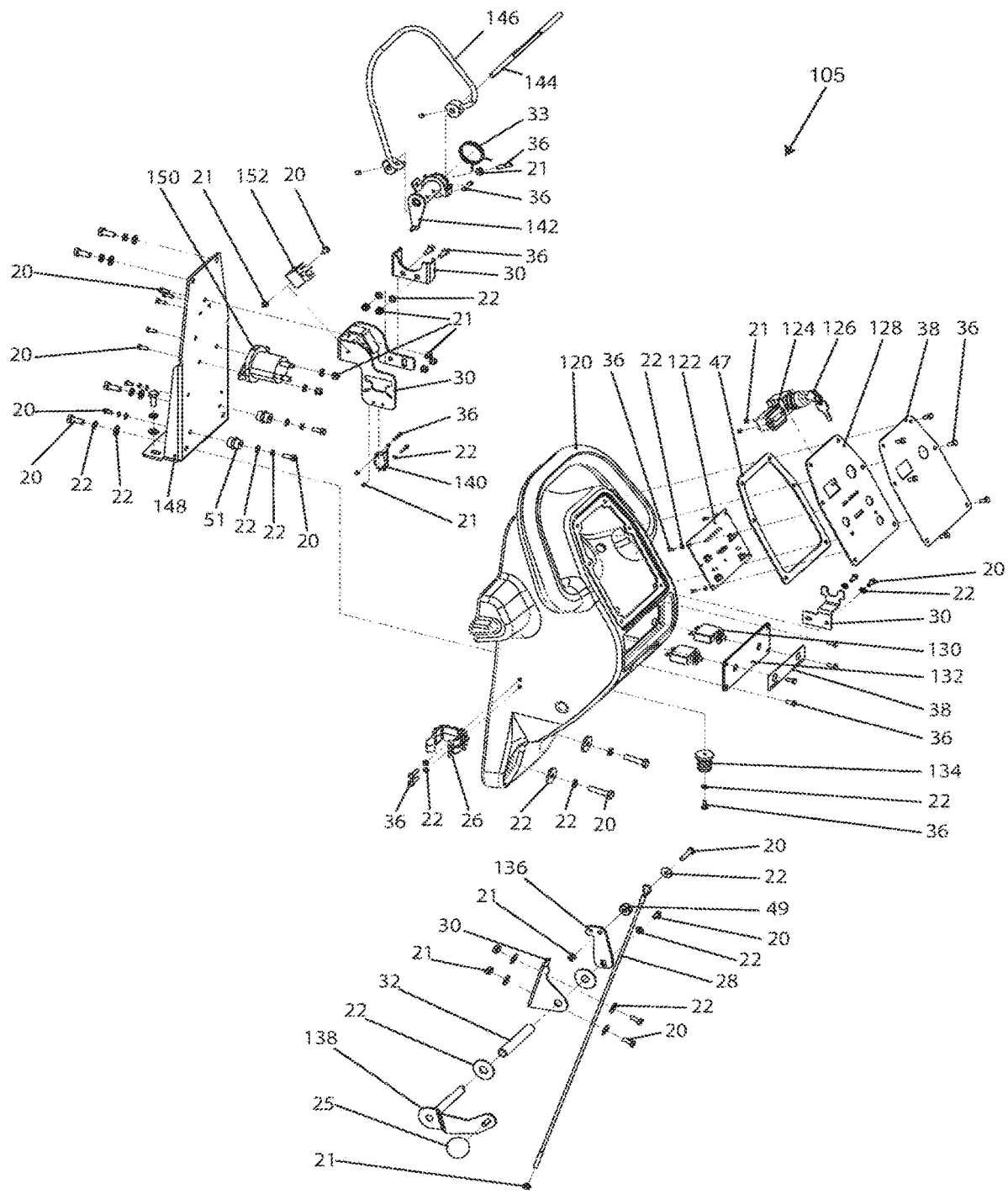
FIG. 8 of the drawings is an exploded isometric view of a control console sub-assembly fabricated in accordance with some embodiments.

Referring now to FIG. 8, in some embodiments, control console sub-assembly 105 generally forms the back or rear portion of floor cleaning machine 100. Control console sub-assembly 105 preferably comprises control console housing 120, PCB assembly 122, timer 124, key switch 126, control panel 128, circuit breaker 130, circuit breaker mounting plate 132, connector 134, baffle 136, squeegee lifting handle 138, micro-switch 140, actuator 142, shaft 144, bail lever 146, control console rear plate 148, solenoid switch 150, and relay 152.

As is also shown in FIG. 8, control console sub-assembly 105 utilizes a plurality of conventional bolts 20, nuts 21, washers 22, knobs 25, clamps 26, cables 28, brackets 30, sleeves 32, springs 33, plates 34, screws 36, indicia/logos/labels 38, gaskets 47, spacers 49, and stand-offs 51 for assembly and use of control console sub-assembly 105.

Figure 9A:
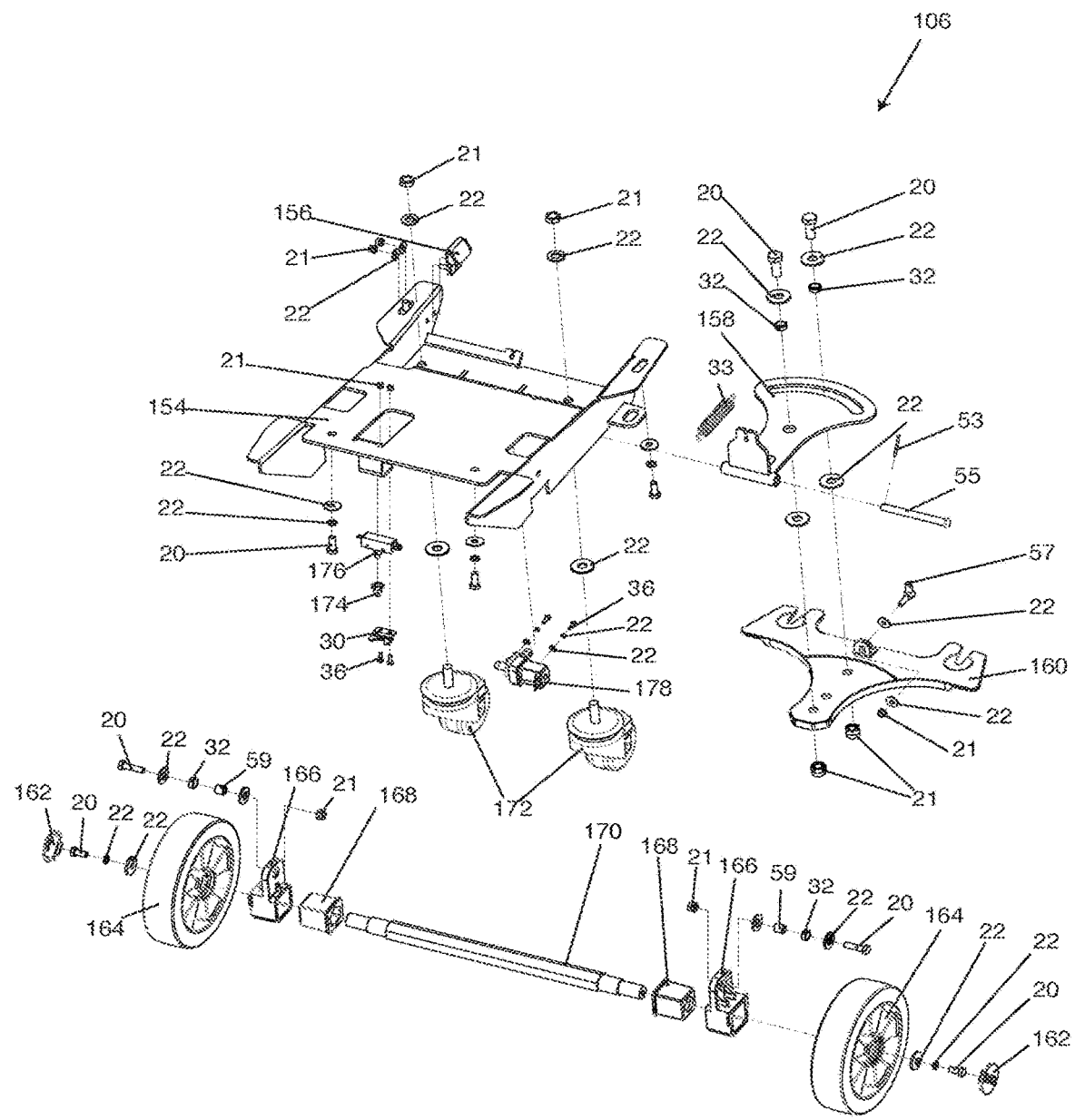
FIG. 9A of the drawings is an exploded isometric view of a frame and wheel sub-assembly fabricated in accordance with some embodiments.

Referring now to FIG. 9A, in some embodiments, frame and wheel sub-assembly 106 (i.e., non-motor driven) generally comprises main frame 154, pedal locking bracket 156, squeegee lift bracket 158, squeegee mounting bracket 160, wheel cover 162, wheel 164, axle mounting adapter 166, axle grommet 168, wheel axle 170, caster 172, micro switch cap 174, micro switch 176, and solenoid valve 178 (e.g., 24V DC).

As is also shown in FIG. 9A, frame and wheel sub-assembly 106 utilizes a plurality of conventional bolts 20, nuts 21, washers 22, brackets 30, sleeves 32, springs 33, plates 34, screws 36, cotters 53, pins 55, ball joints 57, journal bearing 59 for assembly and use of control frame and wheel sub-assembly 106.

Figure 9B:
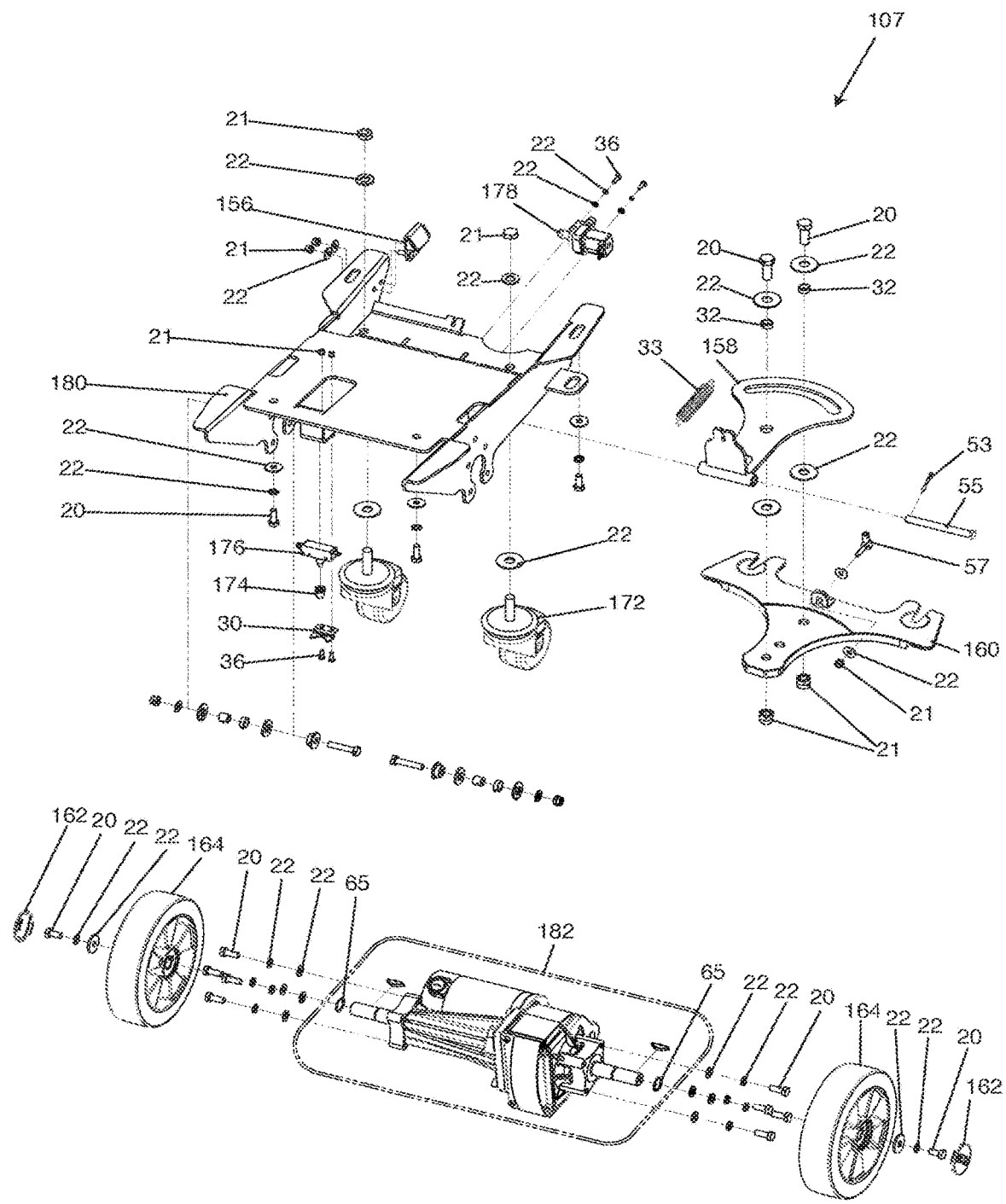
FIG. 9B of the drawings is an exploded isometric view of a frame and transaxle sub-assembly fabricated in accordance with some embodiments.

Referring now to FIG. 9B, in some embodiments, frame and transaxle sub-assembly 107 (i.e., motor driven) generally comprises the same components as frame and wheel sub-assembly 106 (FIG. 9A) except for retaining ring 65, main frame 180 and motor/transaxle 182.

Figure 10:
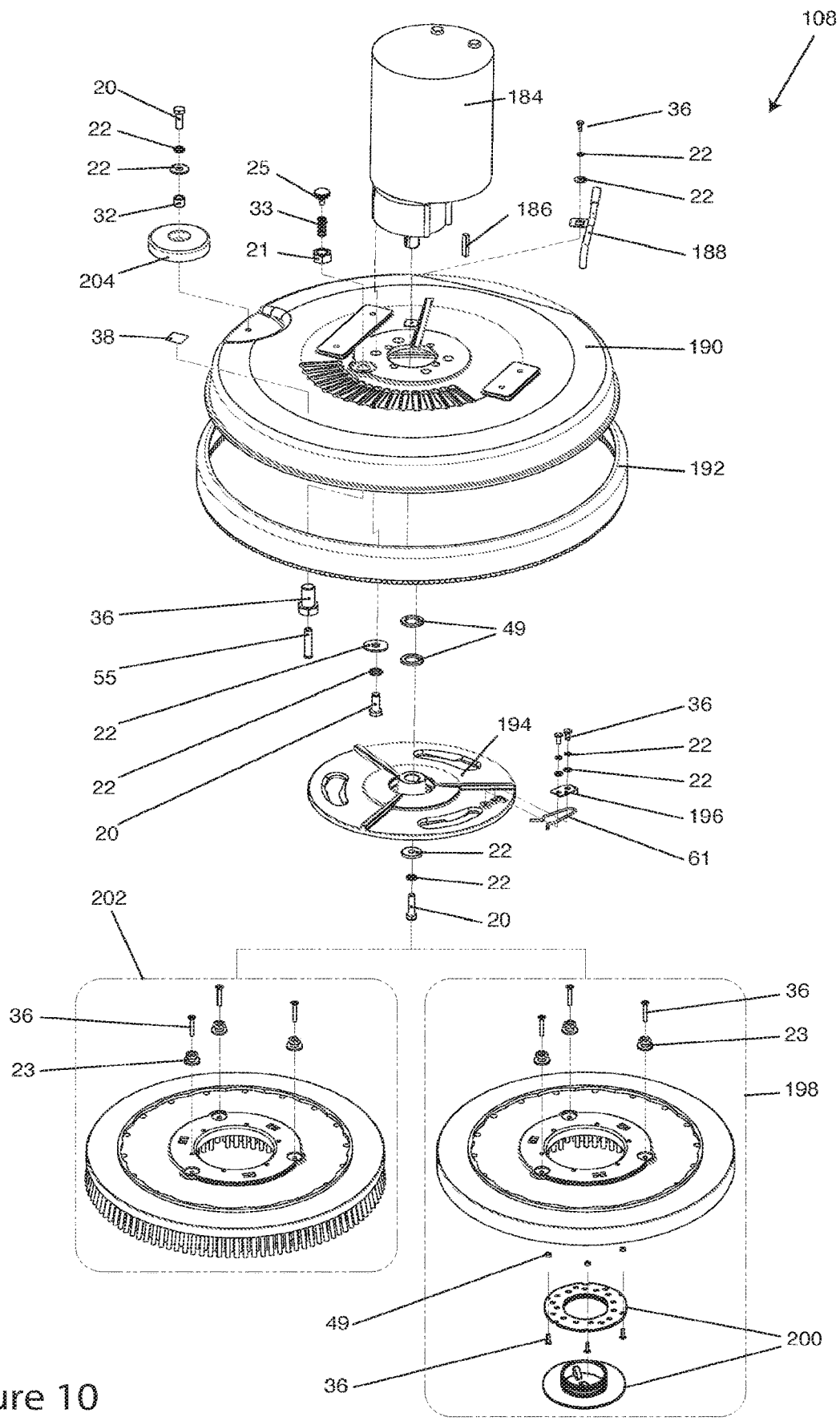
FIG. 10 of the drawings is an exploded isometric view of a scrub head sub-assembly fabricated in accordance with some embodiments.

Referring now to FIG. 10, in some embodiments, scrub head sub-assembly 108 generally comprises brush motor 184 (e.g., 24V DC 1.0 hp), key 186, water supply tube 188, scrub head housing 190, scrub head bumper 192, drive hub 194, brush clamp plate 196, pad driver 198, big mouth 200, brush 202, and protective wheel 204.

As is also shown in FIG. 10, scrub head sub-assembly 108 utilizes a plurality of conventional bolts 20, nuts 21, washers 22, studs 23, knobs 25, sleeves 32, springs 33, screws 36, indicia/labels 38, spacers 49, pins 55, and spring clips 61 for assembly and use of control frame and wheel sub-assembly 106.

Figure 11:
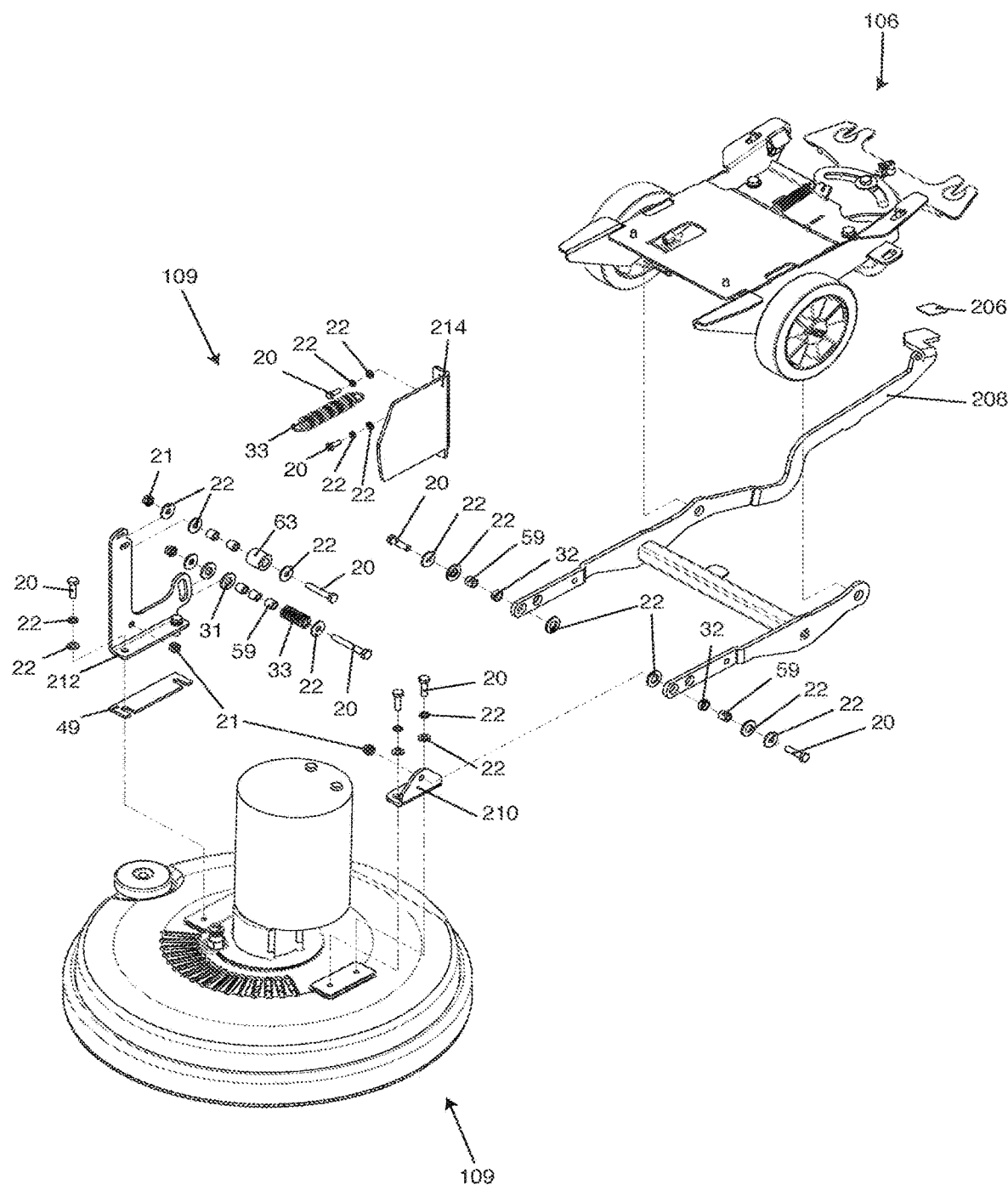
FIG. 11 of the drawings is an exploded isometric view of a scrub head lift sub-assembly fabricated in accordance with some embodiments.

Referring now to FIG. 11, in some embodiments, scrub head lift sub-assembly 109 generally comprises non-slip mat 206, scrub head lift bracket 208, left bracket 210, right bracket 212, and guide bracket 214.

As is also shown in FIG. 11, scrub head lift sub-assembly 109 utilizes a plurality of conventional bolts 20, nuts 21, washers 22, brackets 30, springs 33, plates 34, screws 36, journal bearing 59, and roller 63 for assembly and use of control frame and wheel sub-assembly 106.

Figure 12:
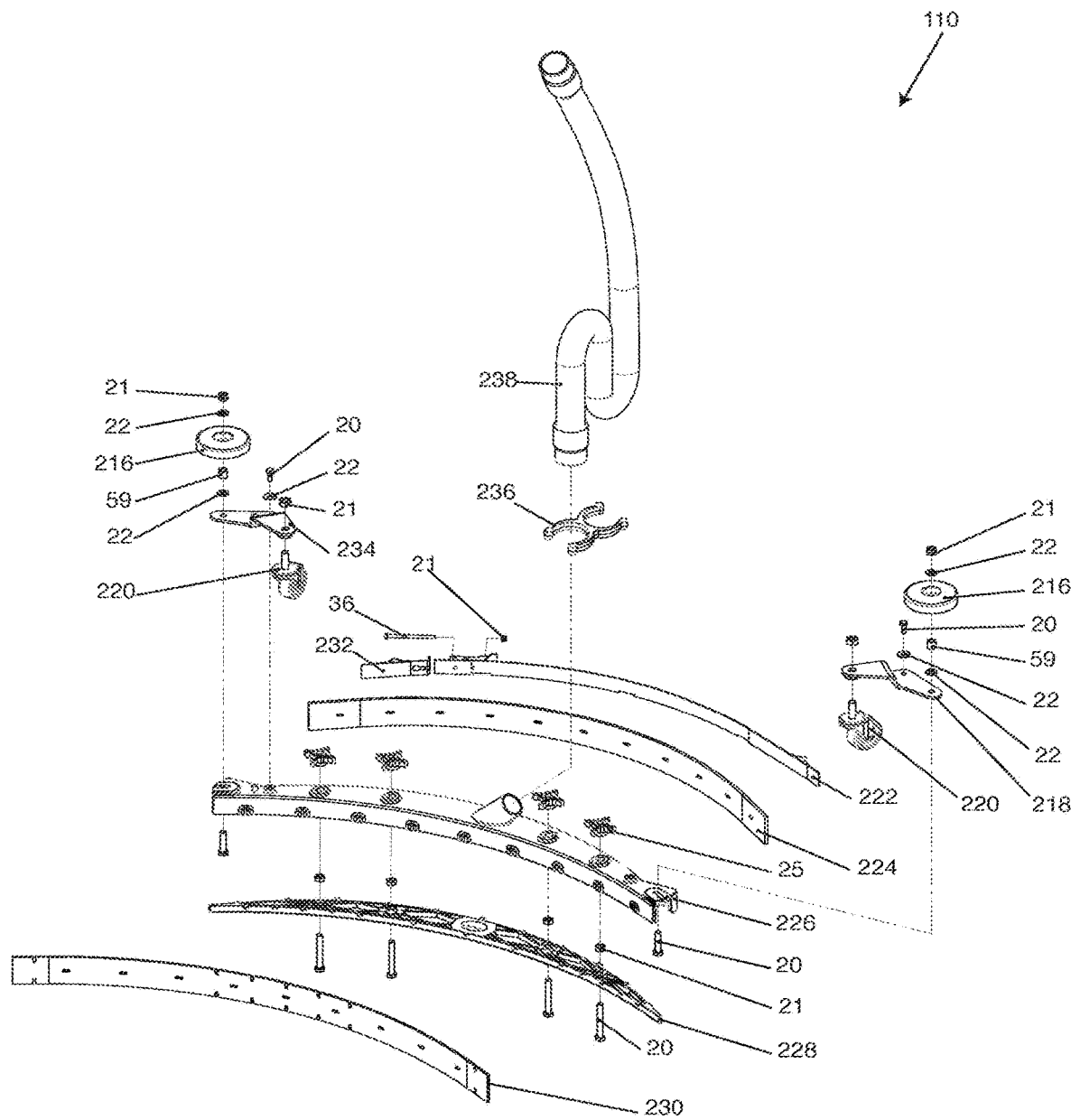
FIG. 12 of the drawings is an exploded isometric view of a squeegee sub-assembly fabricated in accordance with some embodiments.

Referring now to FIG. 12, in some embodiments, squeegee sub-assembly 110 generally comprises protective wheel 216, right bracket 218, caster 220, squeegee clamp assembly 222, rear squeegee blade 224, squeegee housing 226, squeegee retainer 228, front squeegee blade 230, short clamp assembly 232, left bracket 234, vacuum hose holder 236, and vacuum hose 238.

As is also shown in FIG. 12, squeegee sub-assembly 110 utilizes a plurality of conventional bolts 20, nuts 21, washers 22, knobs 25, screws 36, and journal bearings 59 for assembly and use of squeegee sub-assembly 110.

Referring now to FIGS. 13A-B, wiring diagrams for floor cleaning machine 100 are provided. FIG. 13A discloses a floor cleaning machine having frame and wheel sub-assembly 106. FIG. 13B of the drawings discloses a floor cleaning machine having frame and transaxle sub-assembly 107.

In another embodiment, a sub-assembly having an intelligent system for a floor cleaning machine is provided and generally comprises a primary and/or secondary electro-chemical cell, and an intelligent system, wherein the intelligent system at least one of selectively gathers, obtains, monitors, stores, records, and analyzes data associated with components of the floor cleaning machine assembly, and at least one of controllably communicates and disseminates such data with at least one of another system and user.

In accordance with some embodiments, a method for using an intelligent system with a floor cleaning machine assembly is provided and generally, comprises the following steps: (1) providing a floor cleaning machine assembly having an intelligent system; (2) selectively gathering, obtaining, monitoring, storing, recording, and/or analyzing data associated with components of the floor cleaning machine assembly; and (3) controllably communicating and/or disseminating data with at least one of another system and user. In particular and as is collectively shown in FIGS. 1-18, an intelligent system enables a floor cleaning machine assembly to transmit data obtained from the floor cleaning machine assembly to, for example, a storage or data server, which, in turn, transmits selected data to, for example, an end user via email and/or text messaging.

Figure 14:
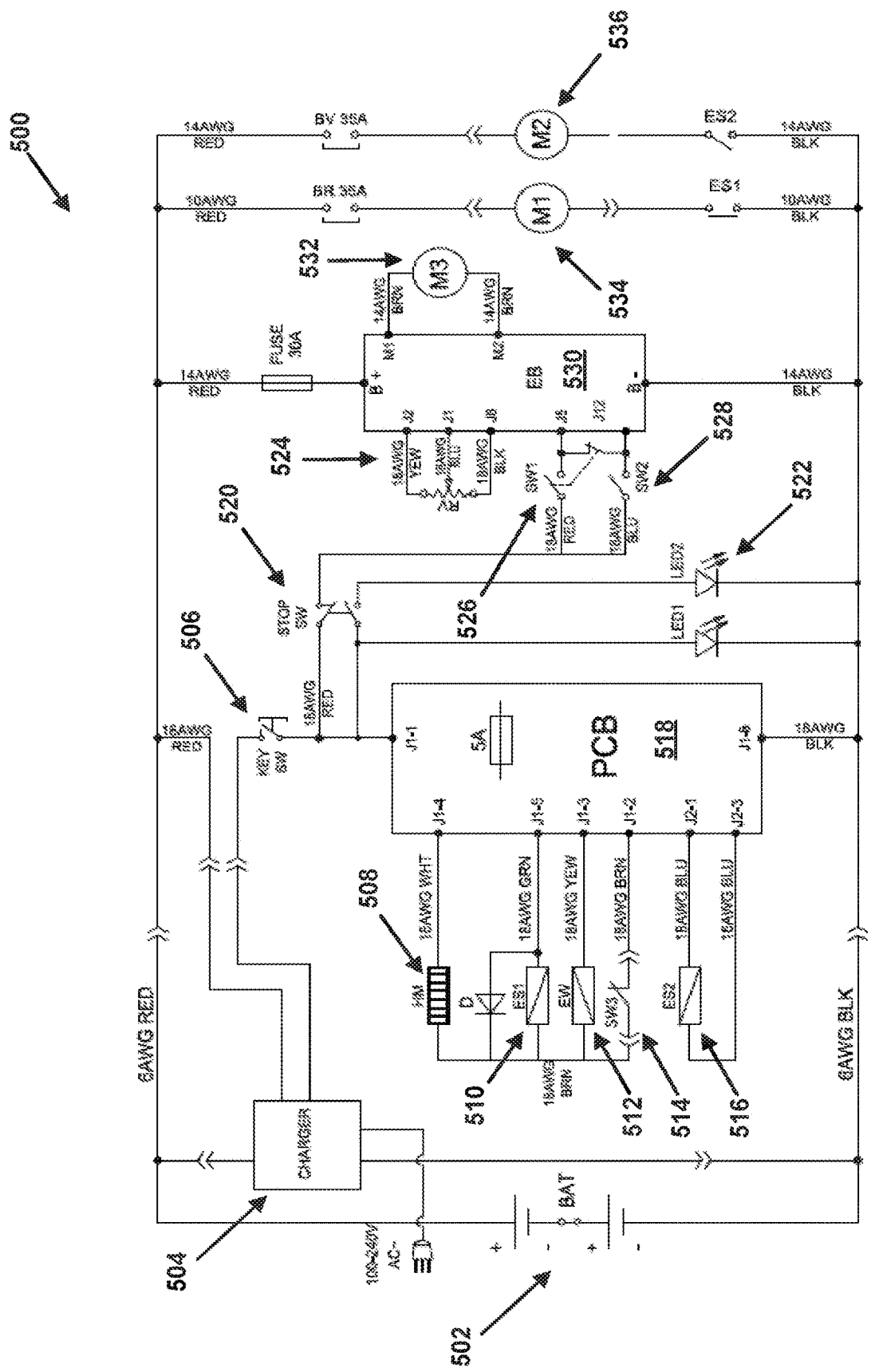
FIG. 14 of the drawings is a schematic of a circuit diagram of a floor cleaning machine fabricated in accordance with some embodiments.

FIG. 14 is a schematic diagram of an example circuit diagram 500 of a floor cleaning machine assembly of the present technology. Generally, the circuit diagram 500 includes a battery interface 502, a charger interface 504, a main power key switch 506, an hour meter 508, a brush motor solenoid switch 510, a solution solenoid valve switch 512, safety switch 514, a vacuum motor relay 516, a printed circuit board (PCB) 518 (e.g., controller), an emergency stop switch 520, a pair of LED interfaces 522, a speed potentiometer 524, a forward control handle bail switch 526, a backward control handle bail switch 528, a speed control board 530, a transaxle motor interface 532, a brush motor interface 534, and a vacuum motor interface 536.

The PCB 518 (e.g., controller) functions as a main controller board for controlling and communicating with various components of the floor cleaning machine assembly. In some embodiments, the PCB 518 can include one or more features of an example computing machine illustrated and described with respect to FIG. 18. The PCB 518 includes at least a processor and a memory for storing executable instructions. The processor can execute the instructions to provide any of the data sensing, gathering, processing, transforming, and/or communication features described herein.

It will be understood that the PCB 518 can be referred to generally as an intelligent system or component that is configured to provide data gathering, recording, logging, transmitting, and analysis functionalities. In other embodiments, an intelligent system can include the PCB 518 that cooperates with a management server, where the PCB 518 gathers and collects operational data for the floor cleaning machine assembly and the management server performs data analysis functionalities on the operational data. In yet other embodiments, an intelligent system can include the PCB 518 that is configured to remotely activate/deactivate (e.g., turn on and off) floor cleaning machine 100 via, for example power key switch 506 or other circuit implantation.

Generally, the PCB 518 is communicatively coupled to each of the other components of the circuit described above, either directly or indirectly. For example, the PCB 518 directly communicates with the batteries of the floor cleaning machine assembly, through the battery interface 502, while the PCB 518 indirectly couples with the transaxle motor interface 532 through the speed control board 530.

The battery interface 502 allows for the PCB 518 to communicate with the Ion batteries to receive feedback including charge level, average usage and current draw, as well as other battery related metrics.

The charger interface 504 allows the PCB 518 to determine charging metrics such as average charging times.

The main power key switch 506 is controlled by the PCB 518 to allow the floor cleaning machine assembly to be turned on and off. Key metrics around the main power key switch 506 can include start and stop times. The PCB 518 can time stamp each operation such as device on and device off instances and record these metrics for statistical or reporting purposes. Other statistics could include time duration between device on and device off operations, which indicate duration of usage for the floor cleaning machine assembly.

The hour meter switch 508 is controlled by the PCB 518 to calculate hours of operation for the floor cleaning machine assembly, in some embodiments.

The brush motor solenoid switch 510 can be controlled by the PCB 518 to selectively control engagement or disengagement of the brush motor 184 of the floor cleaning machine assembly. The PCB 518 can track brush motor usage time by measuring engagement and disengagement of the brush motor 184. These statistics can be compared against device on and device off periods to determine how long the brush is engaged compared to the overall time frame of device on periods. By way of example, the PCB 518 can measure that the device is in a device on state for two hours, but the brush motor was only in use for 15 minutes.

The solution solenoid valve switch 512 can be utilized to control dispensing of solution through a solution dispenser. The PCB 518 can track solution dispensing events, which can be used to calculate metrics around solution utilization.

The safety switch 514 can be controlled with the PCB 518, for example, to lift a scrub head from contact with the floor. In some embodiments, when the PCB 518 activates the safety switch 514, the brush motor solenoid switch 510 can be controlled to disengage the brush motor 184. Other safety related operations can also likewise be accomplished using the safety switch 514.

The vacuum motor relay 516 can be utilized by the PCB 518 to control operation of the vacuum motor 44 of the floor cleaning machine assembly.

The emergency control switch 520 is controlled by the PCB 518 to control operation of an emergency switch of the floor cleaning machine assembly. A user can stop operation of the floor cleaning machine assembly by actuating the emergency switch. Actuation of the emergency switch is sensed by the PCB 518, causing the PCB 518 to selectively stop the brush motor 184 and the transaxle 182.

In one embodiment, the emergency control switch 520 can be used to selectively disrupt power provided to the speed control board 530. That is, the speed control board 530 is configured to control operation of the transaxle motor, by way of the transaxle motor interface 532.

A pair of LED interfaces 522 can be used by the PCB 518 to selectively control operation of LED lights that indicate operational statuses of the device 100, such as forward, backward, power on, and so forth.

The speed potentiometer 524 is controlled by the speed control board 530 to sense input from a user that can be used to vary the speed of the device. For example, the speed potentiometer 524 can receive a speed indication from a user. The speed indication is received by the PCB 518 from input into the speed potentiometer 524. This input is then translated into rotational speed of the transaxle motor through the transaxle motor interface 532.

The forward control handle bail switch 526 provides forward movement of the floor cleaning machine assembly. In some embodiments, the speed control board 504 utilizes the backward control handle bail switch 528 to provide backward movement of the floor cleaning machine assembly.

In response to signals through the forward control handle bail switch 526 and/or signals through the backward control handle bail switch 528, the transaxle motor interface 532 can be used by the speed control board 530 to selectively control the operation of the transaxle motor. For example, the speed control board 530 can selectively control the forward and/or backward rotation of the transaxle motor.

Figure 18:
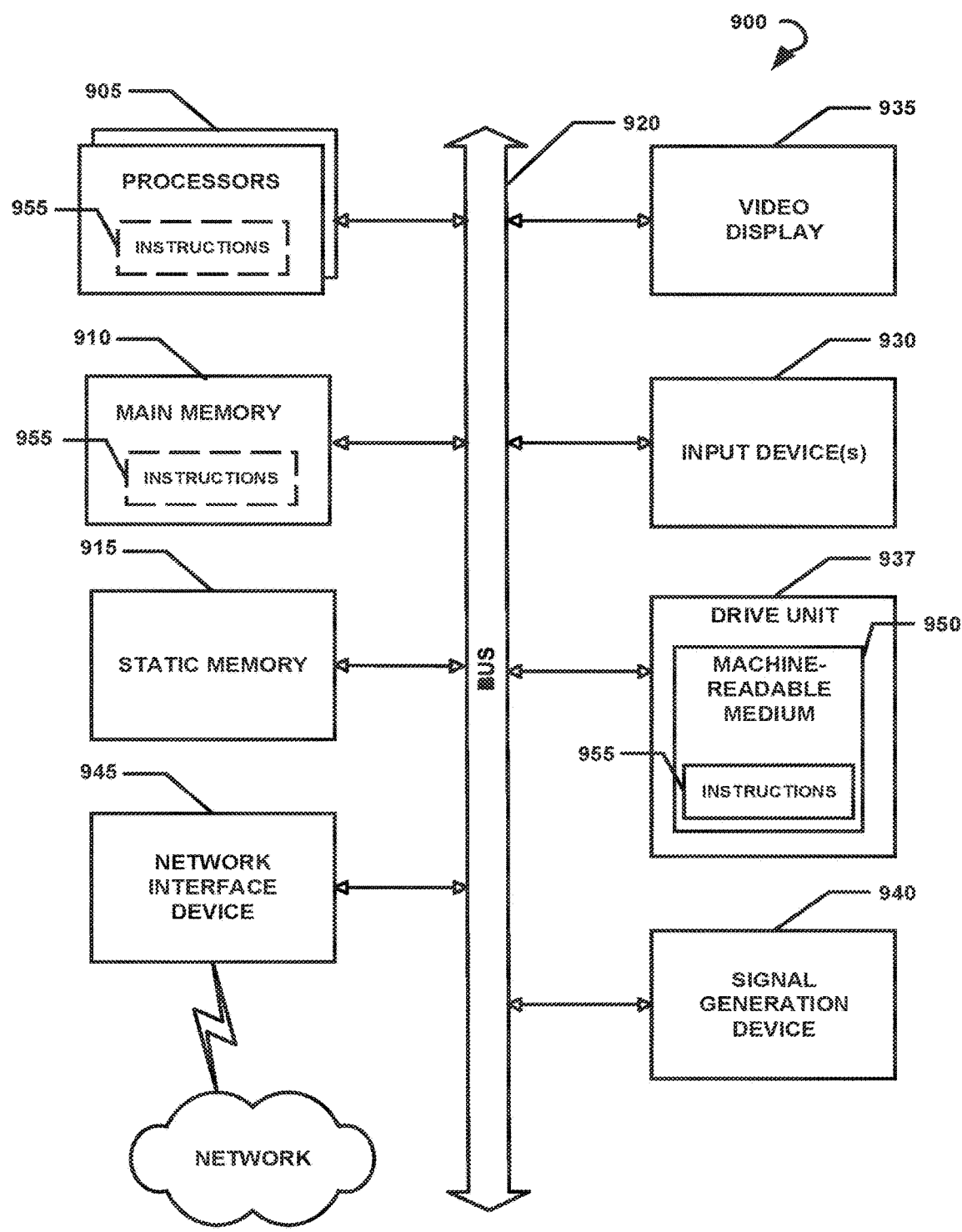
FIG. 18 of the drawings is a diagrammatic representation of a machine in the form of a computer system, in accordance with some embodiments.

As with the PCB 518, the speed control board 530 can include one or more of the components of the computing machine of FIG. 18, such as a processor and memory. To be sure, the memory is configured with executable instructions that allow the processor to perform any of the functional or process related steps described herein.

Additionally, the PCB 518 can be configured to sense and collect the operational information of the speed control board 530 as the speed control board 530 controls the transaxle motor interface 532. For example, the PCB 518 can determine operational speeds for the transaxle motor, usage times, and so forth.

The PCB 518 can also control the brush motor 184 and vacuum motor 44, through their respective interfaces, such as brush motor interface 534 and vacuum motor interface 536. As with other components, the PCB 518 can be configured to sense and collect operational details of these devices.

Figure 15:
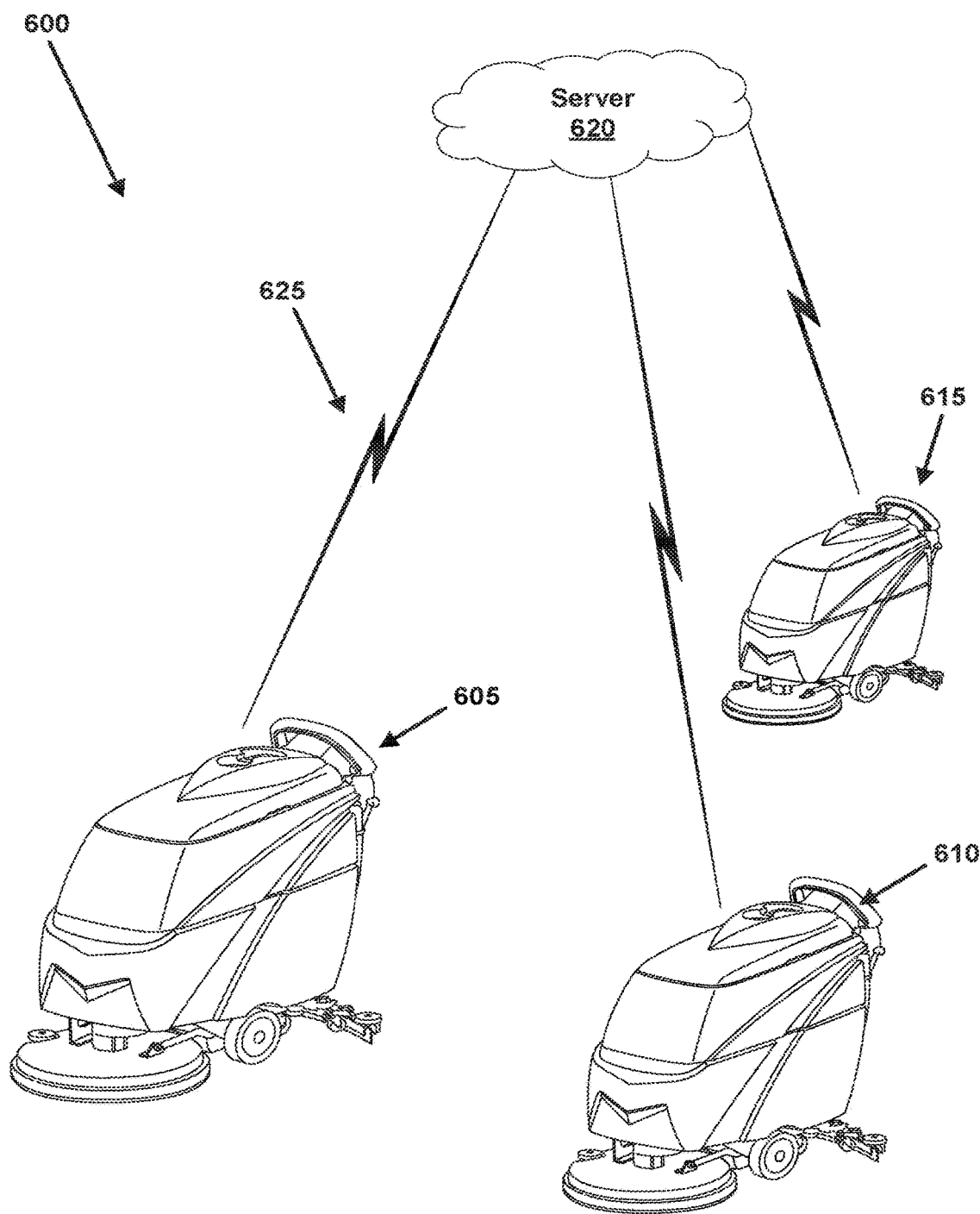
FIG. 15 of the drawings is an illustrative example of a network system of floor cleaning machines.

In some embodiments, the PCB 518 communicates within an intelligent system 600, illustrated in greater detail in FIG. 15. The PCB 518 can include any wired or wireless means of communication such as a wireless communications interface. The wireless communications interface can utilize any protocol for network communication including short range protocols such as Bluetooth, near field communications (NFC), infra-red, and so forth. The wireless communications interface can also include utilize Wi-Fi, a cellular network, or other similar networks using other protocols.

FIG. 15 illustrates an example network system of devices. The networked system 600 comprises a plurality of devices 605, 610, and 615, which can all communicatively couple with a management server 620 over a network 625.

Each of the plurality of devices 605-615 can be collocated in the same facility, such as a building, factory, school, or other location. In other embodiments, one or more (or all) plurality of devices 605-615 can be remotely located from one another.

Each of the plurality of devices 605-615 can gather and report its operational metrics to the management server 620 over the network 625, as will be discussed in greater detail below.

Exemplary networks, such as network 625 may include any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including 4GLTE (Long Term Evolution), 3GPP (3G Radio Access Network), WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 620 can further include or interface with any one or more of an RS-232 serial connection, an IEEE-1394 (Fire wire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The management server 620 is preferably implemented in a cloud-computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™ or such systems may be accessible to outside users who deploy applications within the computing infrastructure to obtain the benefit of large computational or storage resources. The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In operation, each of the plurality of devices 605-615 can communicate with the management server 620, with each of the plurality of devices 605-615 acting as a node within the network. The management server 620 can track metrics about each of the plurality of devices 605-615 by communicating with the PCB on each of the plurality of devices 605-615.

In some embodiments, data obtained by the PCB of each of the plurality of devices 605-615 is selectively gathered, obtained, monitored, stored, recorded, and/or analyzed by the management system 620.

According to some embodiments, data that is selectively gathered, obtained, monitored, stored, recorded, and/or analyzed, preferably comprises, for example, working time, current, voltage, power, and so forth from, for example, the vacuum motor, lithium-ion battery, transaxle, brush deck motor, and other components of the floor cleaning machine assembly. This data or information is preferably received at the PCB 518 (FIG. 14) associated with the lithium-ion battery positioned in the floor cleaning machine 100. That is, the PCB 518 controls the operations of each of the components of the device. As described above, the operational data for each of these components can be captured and logged by the PCB 518 and stored in memory on the PCB 518. In other embodiments, operational data can be stored in memory on the PCB 518 and transmitted asynchronously in batches (according to memory size) to the management server 620. In some embodiments, the operational data can be streamed from the PCB 518 to the management server 620 synchronously.

Each device can be managed by assignment of a device ID by the management system. The device ID can be an assigned number, a SIM card number, an IMEI, a MAC address, an IP address, or other similar unique identifier. The device ID can be appended to each communication transmitted by the PCB 518 to the management server 620.

Stored data or information is preferably analyzed by the management server 620 for parameter compliance, and if, necessary such data or information is then communicated to, for example, an end user, servicing personal, and/or owner. For example, the owner of a floor cleaning machine assembly can set a threshold of hours of operation for the device that are required per week. If the floor cleaning machine assembly is not operated for a period of time that meets or exceeds this threshold, the floor cleaning machine assembly is identified by the management system 620.

The transfer of data with regard to each individual machine will help end users better plan for number of machines and employees at each individual work site. Companies with sizeable cleaning staff, (e.g., contact cleaning companies) will find it relevant and useful.

In one embodiment the data or information with regard to usage of each individual machine is collected and transmitted daily at a specific time to, for example, the management server. This will allow end users, as well as, distributors and dealers to access the information that they need, so as to monitor usage of these machines and allow them to extract maximum efficiency during operations. In another embodiment, other than information for individual days, cumulative totals and averages are readily available too, and the information is preferably updated through the lifespan of the floor cleaning machine assembly. Examples of data or information uploaded on a daily basis include, for example, the number of hours and specific time the machine was in operation during the previous 24 hours, the monthly total hours for machine usage, and the total hours of machine usage. Furthermore, the disclosed technology enables recording and analysis of an accumulation total for working parts like batteries, vacuum motors, transaxles and brush motors. Since each component has a lifespan, it will help distributors, dealers, and owners selectively monitor the exact time when these components (e.g., vacuum motor, brush motor and batteries) need to be changed instead of waiting for them to break down, which will affect the working efficiency of the end users. Another important advantage of having this data or information transfer is that in the event the machine breaks down, (e.g., the vacuum motor, brush motor, etcetera stops working), what has broken down will be selectively transmitted to the appropriate servicing personnel by email and/or cell phone text messaging that is/are responsible for the repairs and maintenance of the machines, management of the end user, and so forth.

Figure 16:
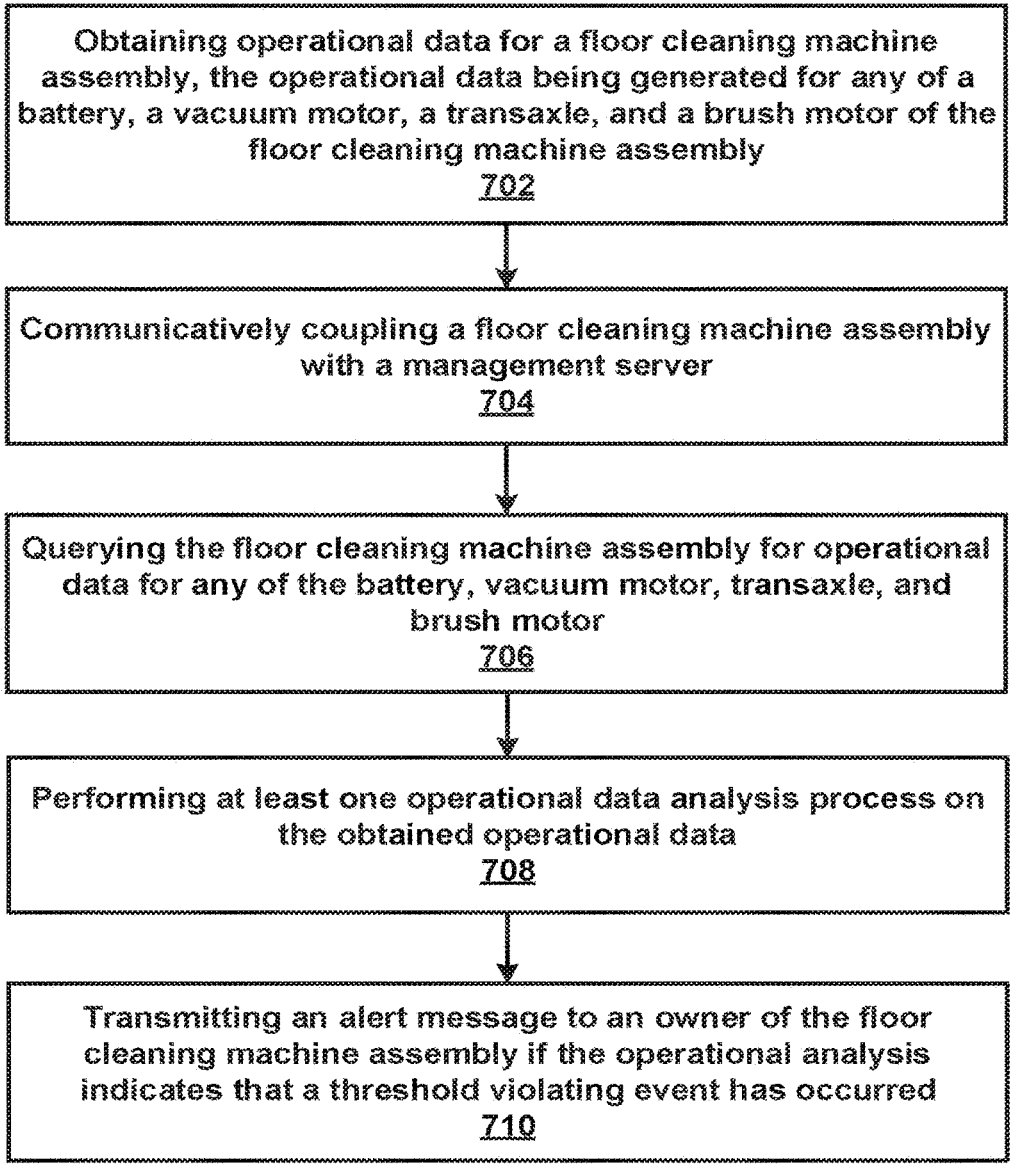
FIG. 16 of the drawings is a flow chart of a method in accordance with some embodiments.

FIG. 16 is a flowchart of an example method of the present technology. The method includes obtaining 702 operational data for a floor cleaning machine assembly, the operational data being generated for any of a battery, a vacuum motor, a transaxle, and a brush motor of the floor cleaning machine assembly.

As mentioned above, this operational data can be gathered by a PCB (such as PCB 518 of FIG. 5) during operation of the floor cleaning machine assembly.

The method also comprises communicatively coupling 704 a floor cleaning machine assembly with a management server. As mentioned above, this could comprise a wireless communication module of the PCB 518 coupling with the management server over a network connection.

Once the floor cleaning machine assembly and the management server are communicatively coupled with one another, the method can further comprise the management server querying 706 the floor cleaning machine assembly for operational data for any of the battery, vacuum motor, transaxle, and brush motor. For example, the management server can request battery related operational data from the floor cleaning machine assembly. As mentioned above, this operational data can be stored on the floor cleaning machine assembly in memory of the PCB. In another example, the management server can request operational data for the vacuum and brush motors.

In another embodiment, the PCB can upload all operational data gathered since a last communication session with the management server. This operational data can include operational data for each of the battery, vacuum motor, transaxle, and brush motor.

In some embodiments, the management server is performing 708 at least one operational data analysis process on the obtained operational data.

Examples of operational data analysis include in one example, comparing the operational time frames for the floor cleaning machine assembly to an expected operational time frame. For example, the owner of a building will determine an operational time frame that the floor cleaning machine assembly should be utilized for. This operational time frame can be calculated from an expected time based on building square footage, or any other quantifiable metric that can be used to set an operational time frame threshold. Once this threshold is established, the management server can compare the actual operational time frame utilized over a given period of time to the operational time frame threshold. If the actual time does not meet or exceed the operational time frame threshold, the management server can alert the owner.

Thus, in some embodiments, the method includes transmitting 710 an alert message to an owner of the floor cleaning machine assembly if the operational analysis indicates that a threshold violating event has occurred. To be sure, a threshold violating event is any event in which operational data for one or more components of the floor cleaning machine assembly do not appropriately compare with an operational threshold.

In another example, an operational threshold could include a minimum charging time frame for the floor cleaning machine assembly. If the floor cleaning machine assembly is not charged for an appropriate amount of time, the battery operation of the floor cleaning machine assembly can be compromised.

In another example, an operational threshold can be set for the brush motor, which can include a comparison with another operational metric such as total operational time. Assume that the total operational time (e.g., power on to power off) for the floor cleaning machine assembly is one hour, but the brush motor is only operational for fifteen minutes of the one hour, it can be deduced that the floor cleaning machine assembly was not in actual use for the entire hour.

Additional metrics can be gathered by tracking revolutions of the transaxle, which can be extrapolated into square foot coverage of the floor cleaning machine assembly. Ideally, transaxle revolutions should be compared to overall operational time to ensure that the floor cleaning machine assembly is moving during power on periods. If the floor cleaning machine assembly is left on when no work is being accomplished, this can lead to unnecessary battery usage.

Knowledge of the approximate square footage of a cleaning area can also be used to determine if the floor cleaning machine assembly is being utilized properly. For example, if by counting transaxle revolutions that the floor cleaning machine assembly has only cleaned approximately 400 square feet, when the total expected square footage for the cleaning area is 2,000 square feet, the management server can detect this discrepancy and transmit an alert message to the owner or another interested party.

Figure 17:
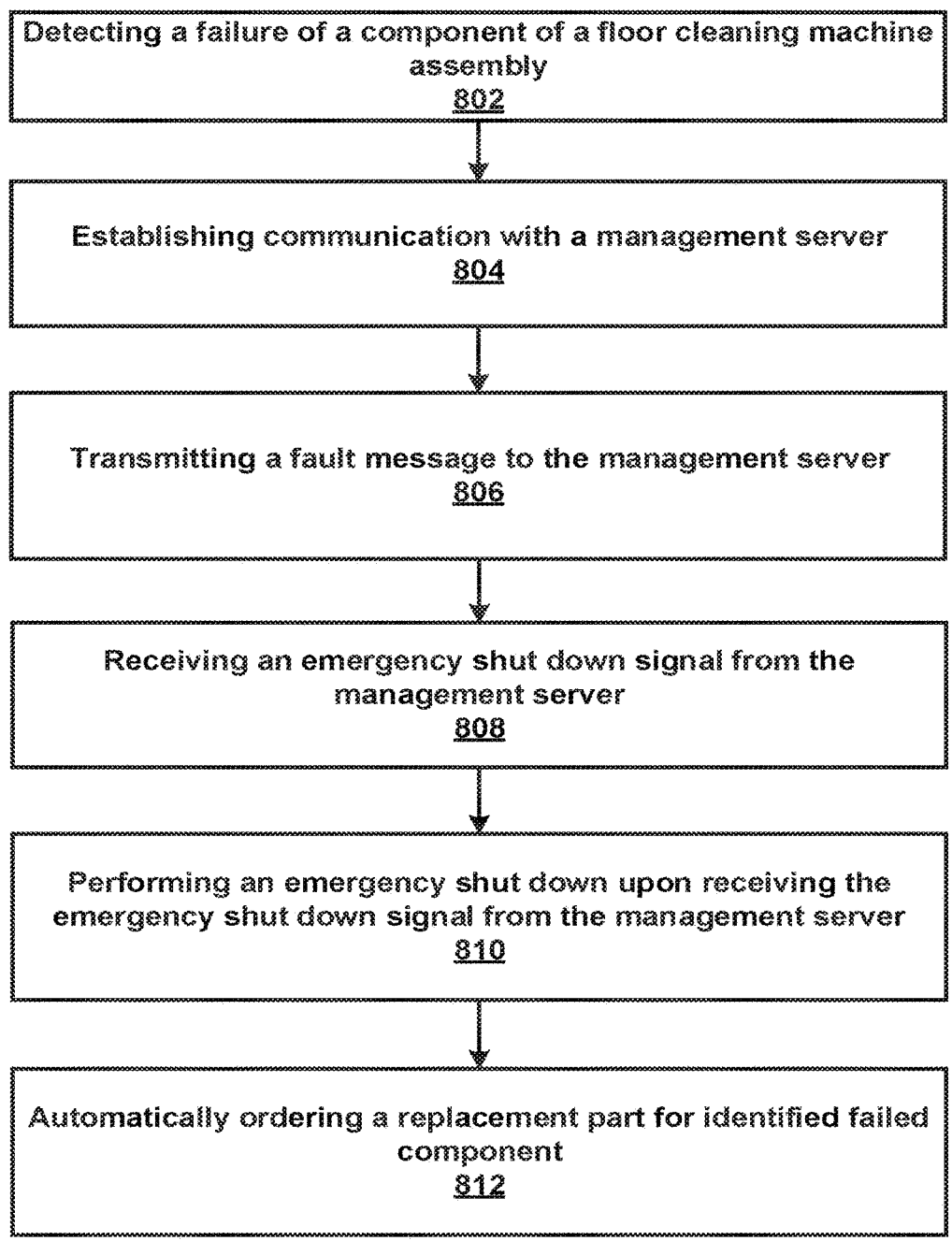
FIG. 17 of the drawings is a flow chart of another method in accordance with some embodiments.

FIG. 17 is another flowchart of an example method of the present technology. The method includes a step of detecting 802 a failure of a component of a floor cleaning machine assembly during operation of the detecting 802 a failure of a component of a floor cleaning machine assembly during operation or startup of the floor cleaning machine assembly.

For example, the PCB can maintain a set of operational thresholds for each component of the floor cleaning machine assembly such as the battery, vacuum motor, transaxle, and brush motor. Whenever any of these components is operating below this expected operational threshold, the failure can be established.

Upon detection of a failure, the method includes the PCB establishing 804 communication with a management server, as well as a step of transmitting 806 a fault message to the management server. The fault message can include an indication as to the component that failed, such as a battery, vacuum motor, transaxle, and brush motor.

If the failure involves a component of the floor cleaning machine assembly that could cause the floor cleaning machine assembly to be a safety hazard, the method can include the floor cleaning machine assembly receiving 808 an emergency shut down signal from the management server. The method also includes performing 810 an emergency shut down upon receiving the emergency shut down signal from the management server. Examples of emergency shut down procedures are described in greater detail supra.

In one embodiment, the method includes an optional step of automatically ordering 812 a replacement part for identified failed component. The floor cleaning machine assembly can communicate directly with a third party system over the network to order the replacement part. In another embodiment, the management server can identify the failed component and perform a lookup of the manufacturer of the failed component and forward the request to the third party system or a local inventory system. The management server can order the part automatically as the fault message is received. In another example, a replacement component in inventory can be identified and identified in a repair ticket that is transmitted to a repair technician.

In some embodiments, the disclosed technology enables upgrades to the software that end users are using that may address, for example, compatibility issues, or other necessary upgrades. In one embodiment, the management server can push updates to the floor cleaning machine assembly during operational data transfer operations, or upon powering up the floor cleaning machine assembly. For example, each time the floor cleaning machine assembly is powered on, the PCB can link with the management server and query the management server for updates. This can all occur transparently to the end user, unless a short pause in operation of the floor cleaning machine assembly is required to implement the update or for safety reasons.

FIG. 18 is a diagrammatic representation of an example machine in the form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 905 (e.g., a central processing unit (CPU), a graphics processing unit (GPU), or both), and a main memory 910 and static memory 915, which communicate with each other via a bus 920. The computer system 900 may further include a video display 935 (e.g., a liquid crystal display (LCD)). The computer system 900 may also include an alpha-numeric input device(s) 930 (e.g., a keyboard), a cursor control device (e.g., a mouse), a voice recognition or biometric verification unit (not shown), a drive unit 937 (also referred to as disk drive unit), a signal generation device 940 (e.g., a speaker), and a network interface device 945. The computer system 900 may further include a data encryption module (not shown) to encrypt data.

The disk drive unit 937 includes a computer or machine-readable medium 950 on which is stored one or more sets of instructions and data structures (e.g., instructions 955) embodying or utilizing any one or more of the methodologies or functions described herein. The instructions 955 may also reside, completely or at least partially, within the main memory 10 and/or within the processors 905 during execution thereof by the computer system 900. The main memory 910 and the processors 905 may also constitute machine-readable media.

The instructions 955 may further be transmitted or received over a network via the network interface device 945 utilizing any one of a number of well-known transfer protocols (e.g., Hyper Text Transfer Protocol (HTTP)). While the machine-readable medium 950 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

Fleet Management

In an aspect, the present disclosure provides systems and methods for fleet management. As used herein, fleet management may refer to the management of multiple robots or machines. The multiple robots may be configured to operate individually or collectively as a fleet or a swarm of robots. The term "fleet" as used herein may refer to any grouping or collection of a plurality of robots or other machines that are controllable by a human or a computer system.

Robots/Machines

The systems and methods disclosed herein may be used to manage one or more robots and/or machines. In some embodiments, a machine may comprise an autonomous, semi-autonomous, and/or non-autonomous robot or machine. In some embodiments, a robot may comprise an autonomous, semi-autonomous, and/or non-autonomous machine or robot. In some embodiments, a robot may be referred to interchangeably as a machine, and a machine may be referred to interchangeably as a robot. In some cases, a robot may be equivalent to a machine, and vice versa. Alternatively, a robot may comprise a system that is capable of operating autonomously or semi-autonomously, and a machine may comprise a non-autonomous system that is capable of being operated by a human or another machine or robot.

In any of the embodiments described herein, the one or more robots or machines may be configured to operate individually or collectively as a fleet or a swarm of robots or machines. The term "fleet" as used herein may refer to any grouping or collection of a plurality of robots or other machines that are independently or jointly controllable by a human or a computer system. The fleet may comprise one or more robots and/or one or more machines. The one or more robots and/or the one or more machines may comprise a non-autonomous, semi-autonomous, or autonomous robot or machine that can be controlled either locally or remotely. The robots and/or machines in the fleet may be controlled by a human operator and/or a computer. In any of the embodiments described herein, the fleet may comprise a combination of robots and/or machines. In any of the embodiments described herein, the fleet may comprise a combination of autonomous, semi-autonomous, and/or non-autonomous robots and/or machines.

In some embodiments, the robots or machines may comprise a non-autonomous robot or machine. Such non-autonomous robot or machine may not or need not comprise or have autonomous navigation functions or capabilities. In some cases, such non-autonomous robot or machine may be configured to operate based on one or more inputs, commands, or instructions provided by a human operator. The one or more inputs, commands, or instructions may comprise a physical motion to move the robot or machine, an auditory communication, or a virtual input or selection of an action or movement to be performed by the robot or machine.

In some embodiments, the robots or machines may comprise, for example, a non-autonomous vehicle, a semi-autonomous vehicle, or an autonomous vehicle, a rover, a drone, or a shuttle for transporting humans or objects. In some cases, the robots or machines may comprise a humanoid robot or a non-humanoid robot. In some cases, the robots or machines may comprise a cleaning robot (e.g., a floor scrubber or a vacuum). In some cases, the robots or machines may be configured to operate in an indoor environment (e.g., a building). In other cases, the robots or machines may be configured to operate in an outdoor environment.

Management

The systems and methods disclosed herein may be used to manage a plurality of robots and/or machines. Managing the plurality of robots and/or machines may involve controlling an operation of the robots and/or machines, tracking the usage or the status of the robots and/or machines, monitoring robot and/or machine performance, or recording and updating one or more records associated with the robots and/or machines. The records may comprise, for example, user account records or financial records relating to a transaction (e.g., a sale or a lease) involving the robots and/or machines. In some cases, managing the plurality of robots and/or machines may involve programming or directing the robots and/or machines to navigate an environment and perform one or more tasks while navigating the environment. The robots and/or machines may be programmed or directed to navigate various environments autonomously or semi-autonomously according to a predetermined or adjustable motion path or motion logic. In some cases, the robots and/or machines may be programmed to navigate different environments differently, or to navigate a same environment in different ways depending on the presence of obstacles or the time of day.

In some embodiments, managing the robots and/or machines may comprise obtaining operational data associated with the robots and/or machines and detecting changes or deviations in expected robot or machine performance or behavior. In some cases, managing the robots and/or machines may comprise coordinating, prioritizing, and/or scheduling one or more service, maintenance, or repair tasks based on the operational data or the detected changes in expected robot or machine performance or behavior.

System

In one aspect, the present disclosure provides a system for fleet management. The system may comprise one or more servers and/or one or more processing units for managing, controlling, and/or monitoring one or more robots and/or machines. In some cases, the one or more servers may comprise the one or more processing units. The one or more servers and/or one or more processing units may be located remote from the one or more robots and/or machines and the environment in which the one or more robots and/or machines are operating. The systems described herein may be used to manage, control, and/or monitor robots and/or machines. The terms robot(s) and machine(s) may be used interchangeably as described elsewhere herein.

Figure 19:
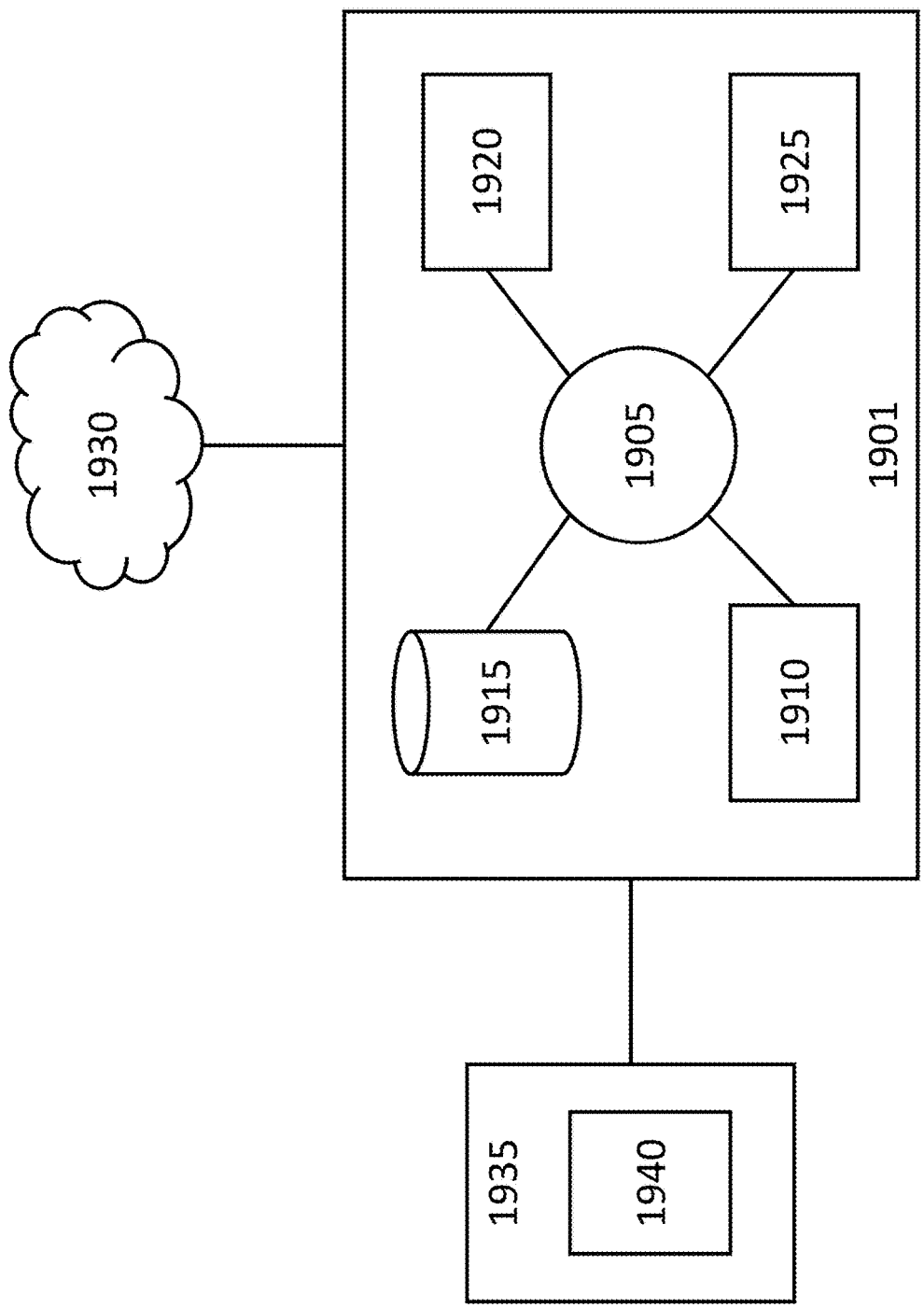
FIG. 19 schematically illustrates a computer system that is programmed or otherwise configured to implement any of the methods provided herein, in accordance with some embodiments.

FIG. 19 schematically illustrates an example of a system 1901 that may be programmed or otherwise configured to implement methods of the present disclosure, including various methods for managing robots and/or machines or fleets of robots and/or machines. The system 1901 may comprise a computer system comprising a central processing unit 1905. The system 1901 may further comprise a memory or memory location 1910 (e.g., random-access memory, read-only memory, flash memory), an electronic storage unit 1915 (e.g., hard disk), a communication interface 1920 (e.g., network adapter) for communicating with one or more other systems (e.g., one or more robots and/or machines), and one or more peripheral devices 1925, such as cache, other memory, data storage and/or electronic display adapters. The computer system 1901 may be operatively coupled to a network 1930 (or any servers accessible via the network 1930) with the aid of the communication interface 1920. In some embodiments, the computer system may include or be in communication with an electronic display 1935 that comprises a user interface (UI) 1940 for providing, for example, a portal for a user or operator to monitor or track (i) an operation of one or more robots and/or machines or any components of said robots and/or machines and/or (ii) a maintenance, service, or repair of the one or more robots and/or machines or components.

Figure 20:
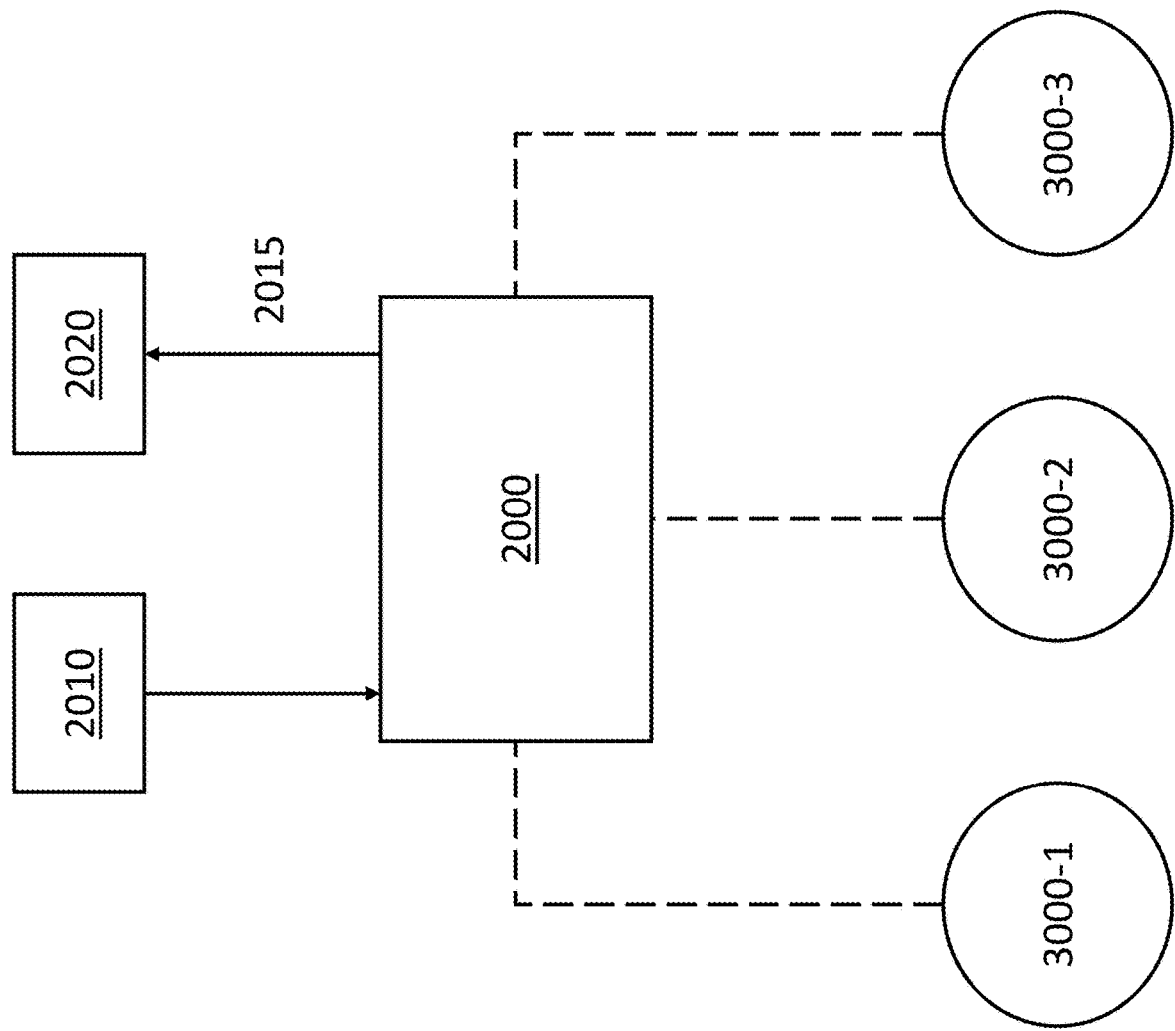
FIG. 20 schematically illustrates a plurality of robots and/or machines in communication with a central server, in accordance with some embodiments.

FIG. 20 schematically illustrates a central server 2000 and a plurality of robots and/or machines 3000-1, 3000-2, and 3000-3 that are in communication with the central server 2000. The central server 2000 may comprise or may be operatively coupled to the computer system 1901 illustrated in FIG. 19. In some cases, the central server may be configured to receive operational data from the plurality of robots and/or machines 3000-1, 3000-2, and 3000-3. The plurality of robots and/or machines 3000-1, 3000-2, and 3000-3 may be in communication with each other. Alternatively, the plurality of robots and/or machines 3000-1, 3000-2, and 3000-3 may not or need not be in communication with each other.

The plurality of robots and/or machines 3000-1, 3000-2, and 3000-3 may each comprise one or more sensors. The one or more sensors may be used to capture the operational data associated with the operation or the status of the plurality of robots and/or machines 3000-1, 3000-2, and 3000-3.

The central server 2000 may be configured to compare the operational data to one or more reference values or thresholds associated with the operation or the status of the one or more robots and/or machines or one or more components of the one or more robots and/or machines. In some cases, the central server 2000 may be configured to receive the one or more reference values or thresholds from a memory module 2010. The central server 2000 may be configured to detect one or more changes or deviations in operation or expected behavior for the one or more robots and/or machines or the one or more components of the one or more robots and/or machines based at least in part on the comparison of the operational data to the one or more reference values or thresholds. The one or more changes or deviations may indicate or identify at least one robot and/or machine or component to be serviced, maintained, or replaced.

In some embodiments, the central server 2000 may be configured to generate and transmit one or more maintenance or repair instructions 2015 for the at least one robot and/or machine or component to one or more entities 2020. The one or more entities 2020 may comprise a repair or service technician or a maintenance provider. In some cases, the one or more entities 2020 may comprise a maintenance or repair station.

In some cases, the one or more maintenance or repair instructions may be generated or transmitted based at least in part on a priority of maintenance associated with the at least one robot and/or machine or component. The priority of maintenance may be determined by the central server 2000. For example, the priority of maintenance may be determined based on a level or severity of component wear or breakdown. The level or severity of component wear or breakdown may be determined based on a magnitude of the deviation between the robot's expected performance and the robot's actual performance. In some cases, the magnitude of the deviation may be determined by comparing the robot or machine's actual performance to one or more threshold values. In some cases, the level or severity of component wear or breakdown for one robot or machine may be determined relative to the level or severity of component wear or breakdown for another different robot (e.g., a robot or machine that is more critical or instrumental to performing a certain task or service). In some cases, the level or severity of wear or breakdown for a first component may be adjusted relative to the level or severity of wear or breakdown for a second component. In some cases, the first component and the second component may be located on or associated with the same robot. In other cases, the first component and the second component may be located on or associated with different robots and/or machines.

Figure 21:
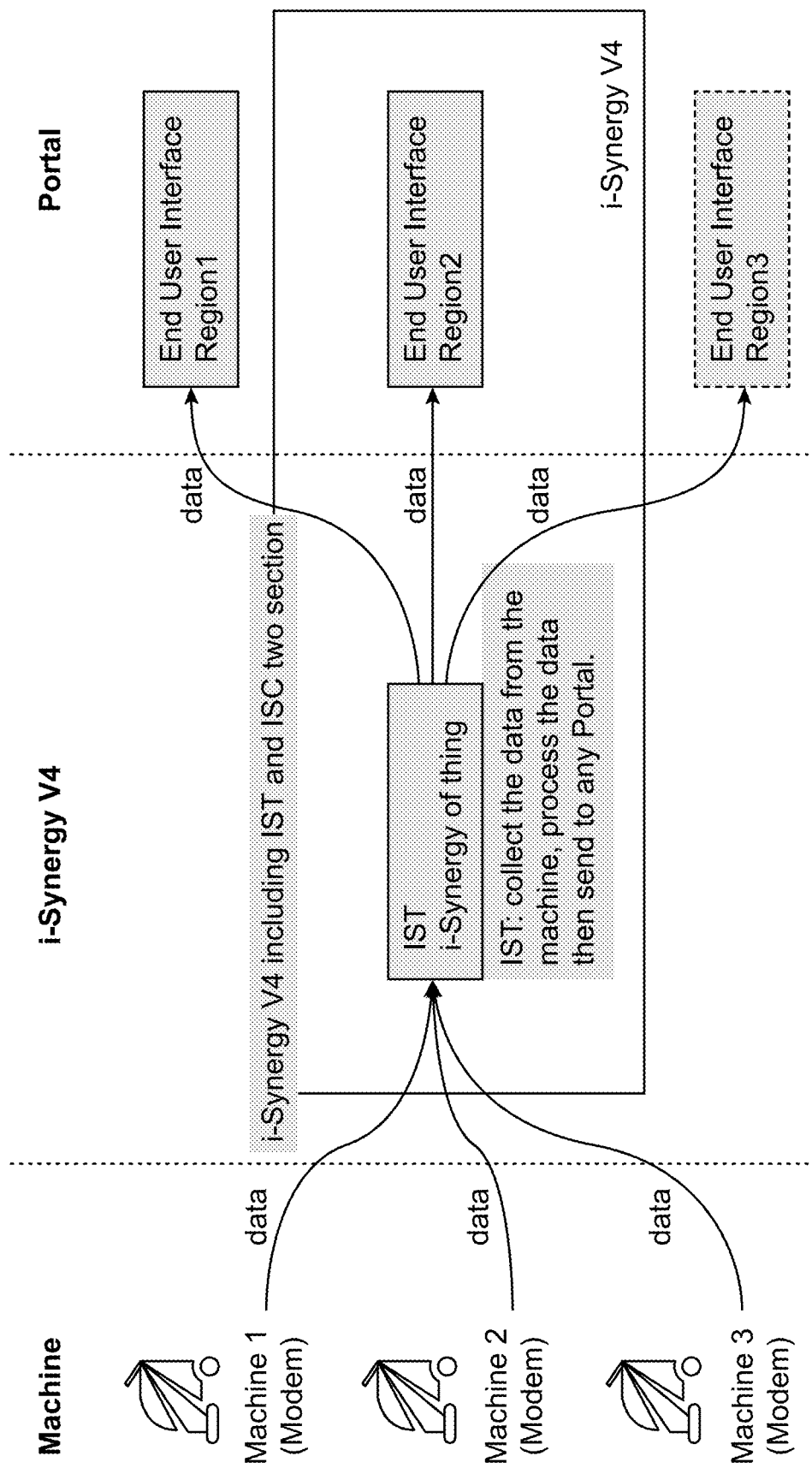
FIG. 21 schematically illustrates a platform for collecting and processing operational data of one or more robots and/or machines, in accordance with some embodiments.

FIG. 21 illustrates an exemplary platform for collecting and processing operational data of one or more robots or machines. The operational data of each robot or machine in a fleet may be transmitted to a central server or platform, which may be configured to collect and process the operational data. The operational data and/or any other information that can be derived from the processing of the operational data may be transmitted to one or more end user interfaces or portals to facilitate the monitoring and maintenance of various robots or machines within a fleet. In some cases, the central server or platform may comprise an IoT platform that synergizes the management of multiple robots in a fleet based on machine data obtained from one or more of the multiple robots in the fleet.

In any of the embodiments described herein, the multiple robots and/or machines may be configured to communicate with the central server or platform through a modem, which may have set access restrictions. In some cases, when a robot or machine obtains and uploads operational data, it may need to obtain an access token from the central server, and then encrypt the operational data. The central server or platform may then decrypt the data and store it in a database (e.g., a cloud database) for additional data processing.

Figure 22:
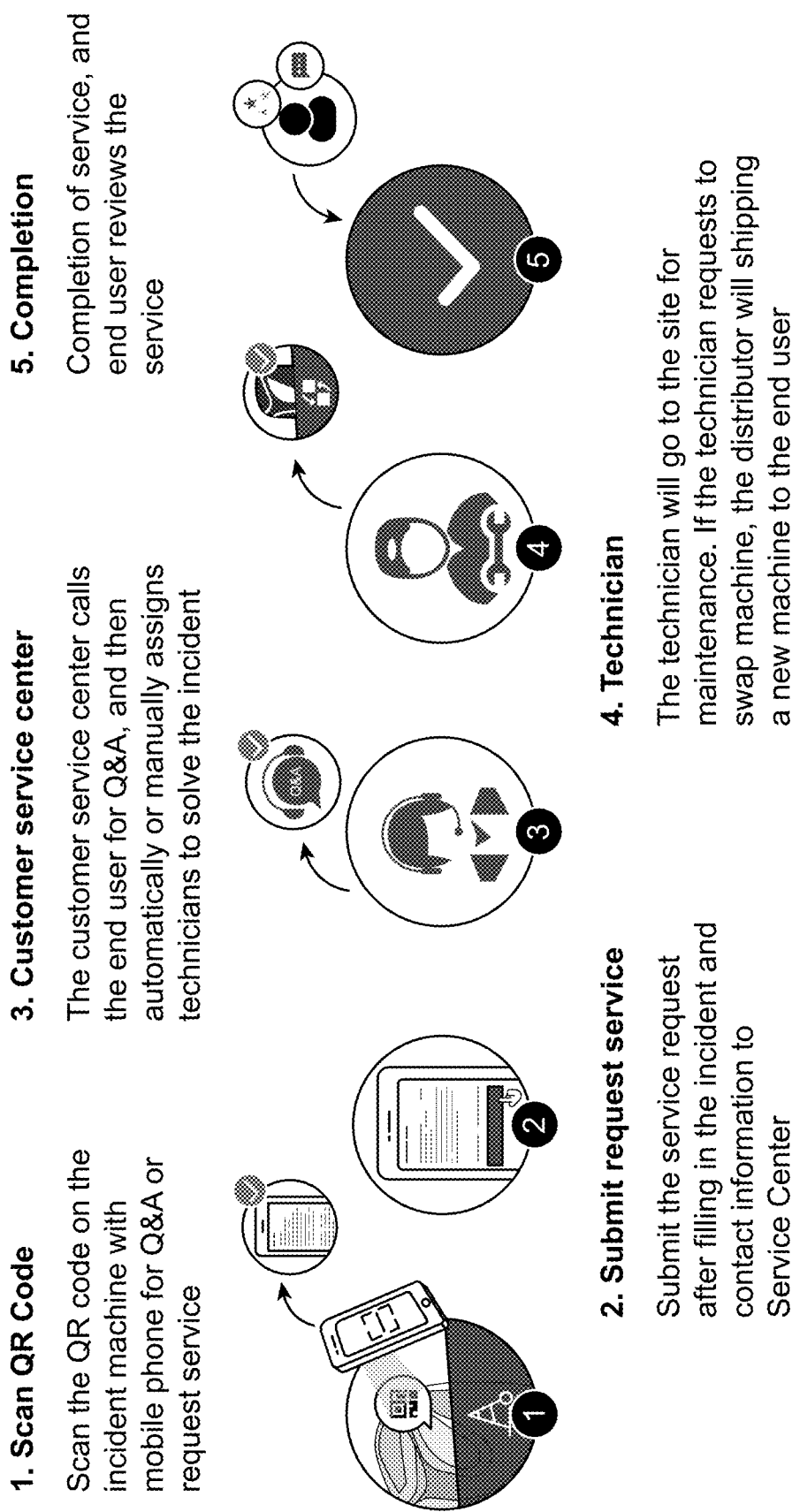
FIG. 22 schematically illustrates a process for servicing a robot or machine, in accordance with some embodiments.

FIG. 22 illustrates an exemplary process for servicing a robot or machine. The process may involve scanning a quick response (QR) code associated with a robot or machine or a component using a mobile device. The QR code may be scanned to initiate a Q&A session or to request service or maintenance.

In some cases, the user scanning the QR code may submit a service request after providing information on a change or deviation in robot performance or behavior. A customer service center may contact the end user for Q&A, and then automatically or manually assign a technician to resolve the incident. The technician may travel to the site where the robot or machine is located for maintenance. In some cases, if the technician requests to swap the robot or machine, the distributor may be informed so that the distributor can ship a new robot or machine to the end user. Once the machine or robot is serviced, or the replacement machine or robot is shipped to the end user, the end user may review the customer/field service provided.

Figure 23:
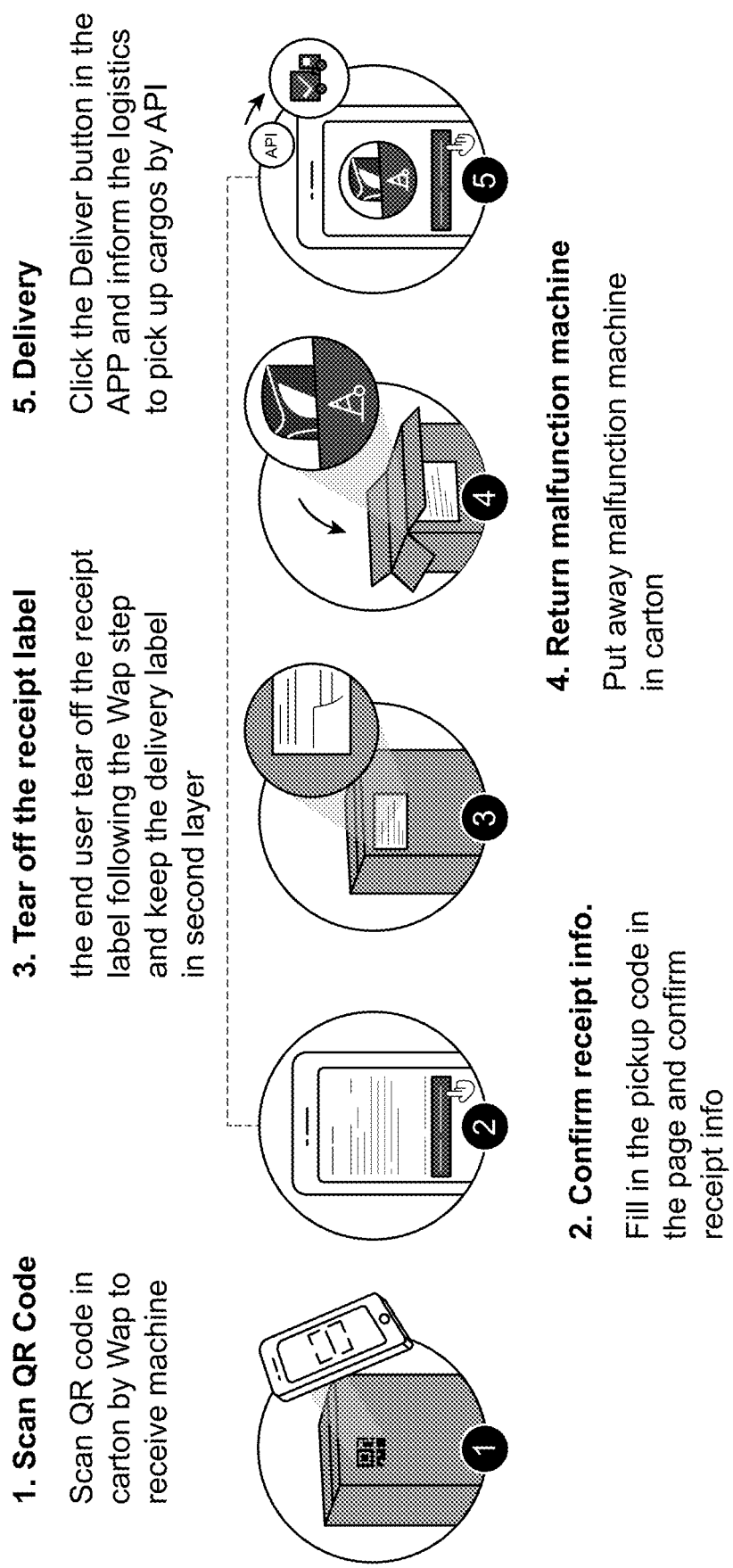
FIG. 23 schematically illustrates a process for swapping out a robot or machine, in accordance with some embodiments.

FIG. 23 illustrates an exemplary process for swapping out a robot or machine. Initially, a user may scan a QR code on a carton or box that is sized and shaped to contain a robot or machine. The user may then confirm receipt of the carton or box by filling in a pickup code. The user may then tear off a receipt label and keep a delivery label associated with the carton or box. The user may then return a malfunctioning robot by placing the malfunctioning robot in the carton or box. The user may then use an application (e.g., a mobile application) to indicate that the malfunctioning robot is ready to be picked up for transport back to a manufacturer, a distributor, or a service technician.

Figure 24:
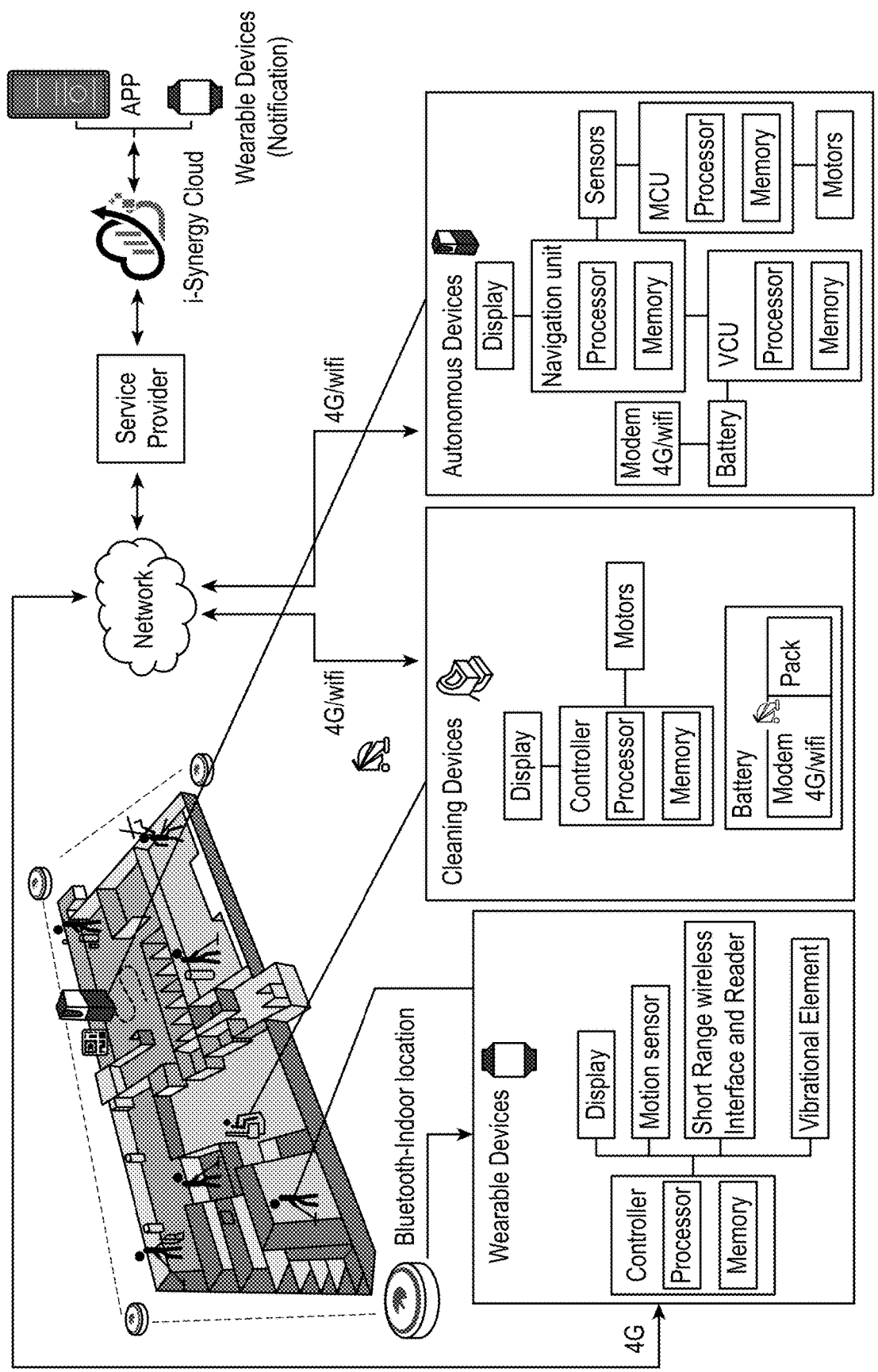
FIG. 24 schematically illustrates a system for managing a fleet of robots and/or machines, in accordance with some embodiments.

FIG. 24 illustrates an exemplary system for managing a fleet of robots and/or machines. The system may comprise a cloud server that is in communication with one or more robots and/or machines via a wireless communication network. The cloud server may be operatively coupled to a plurality of robots or machines that are configured to operate in an environment. In some cases, the environment may be an indoor environment. The indoor environment may comprise, for example, a building. In some cases, the indoor environment may comprise an environment that supports wireless communications. In some embodiments, the one or more robots and/or machines may be configured to operate in and around peripheral areas of a building. In some embodiments, the one or more robots and/or machines may be configured to operate in an outdoor environment. The outdoor environment may be external to a building. The outdoor environment may include, for example, private roads and/or public roads.

In some cases, the plurality of robots or machines may comprise an autonomous device. The autonomous device may comprise an autonomous robot comprising a display, a navigation unit with a processor and a memory module, a VCU with a processor or memory module, one or more sensors, an MCU comprising a processor and memory, one or more motors, a battery, and a communication unit (e.g., a modem for 3G, 4G, 5G, bluetooth, or wifi-based communications). The sensors may be operatively coupled to the navigation unit and the MCU. The one or more motors may also be operatively coupled to the MCU. In some cases, the navigation unit may be operatively coupled to the VCU.

In some embodiments, the plurality of robots or machines may comprise one or more cleaning devices. The one or more cleaning devices may comprise a display, a controller comprising a processor and memory, one or more motors, a battery, and a communication unit (e.g., a modem for 3G, 4G, 5G, bluetooth, or wifi-based communications).

In some cases, one or more wearable devices may be worn by an operator of the robots or machines. The one or more wearable devices may comprise a controller with a processor and a memory, a display, a motion sensor for detecting a movement of the robot or the user operating the robot, a short range wireless communication interface, and a vibrational element for providing alerts or notifications to the user operating the robot.

In some cases, the autonomous devices, the cleaning devices, and the wearable devices may be in communication with a cloud server via a network. The network may permit a transmission of data between (i) a service provider or a cloud server and (ii) the autonomous devices, the cleaning devices, and the wearable devices. The service provider or cloud server may be configured to process data received from the autonomous devices, the cleaning devices, and/or the wearable devices. The service provider or cloud server may be configured to monitor or control an operation of the autonomous devices and/or the cleaning devices based on the operational data received from the autonomous devices or the cleaning devices. In some cases, the service provider or cloud server may be configured to provide one or more notifications to a user or an operator of the autonomous devices and/or the cleaning devices based on the operational data received from the autonomous devices or the cleaning devices. The one or more notifications may indicate, for example, that a change or deviation in expected robot performance or behavior has been detected, or that a variance in a planned motion logic of the robot has been identified. In some cases, the service provider or cloud server may interface with a mobile application or a web application to facilitate tracking of robot operation and/or the processing of fleet information/machine data.

Methods

In another aspect, the present disclosure provides a method for managing one or more robots and/or machines. The methods described herein may be used to manage, control, and/or monitor robots and/or machines. The terms robot(s) and machine(s) may be used interchangeably as described elsewhere herein. The method may comprise (a) receiving and processing operational data corresponding to an operation or a status of one or more robots at a central server that is in communication with the one or more robots or machines. In some cases, the processing of the operational data may comprise comparing (i) the operational data to (ii) one or more reference values or thresholds associated with the operation or the status of the one or more robots and/or machines or one or more components of the one or more robots and/or machines.

In some embodiments, the method may further comprise (b) detecting, based at least in part on the comparison in (a), one or more changes or deviations in operation or expected behavior for the one or more robots and/or machines or the one or more components of the one or more robots and/or machines. In some cases, the one or more changes or deviations may indicate or identify at least one robot and/or machines or component to be serviced, maintained, or replaced.

In some embodiments, the method may further comprise (c) generating and transmitting one or more maintenance or repair instructions for the at least one robot or component. The one or more maintenance or repair instructions may be generated based at least in part on a priority of maintenance associated with the at least one robot or machine or component. The one or more maintenance or repair instructions may be transmitted to a service technician, a maintenance service provider, or a repair station.

Operational Data

The operational data may be gathered or obtained using one or more sensors of the one or more robots. In some cases, the one or more sensors may comprise a position sensor, a GPS unit, an encoder, an odometer, an accelerometer, an inertial measurement unit (IMU), a gyroscope, or a velocity sensor. In some cases, the one or more sensors may comprise, for example, a temperature sensor, a pressure sensor, a humidity sensor, or any other type of environmental sensor for sensing the conditions of the environment in which the one or more robots and/or machines are being operated. In some cases, the one or more sensors may comprise an optical sensor or a vision sensor. The optical sensor may comprise, for example, an imaging sensor or a camera. In some cases, the one or more sensors may comprise a lidar sensor, a vision sensor, a time of flight sensor (e.g., a 3D time of flight sensor), a binocular vision sensor, a stereoscopic vision sensor, or an ultrasound sensor.

In some embodiments, the operational data may be received from a single robot or machine or from multiple robots and/or machines. In some cases, the operational data may be received from multiple robots in series or sequentially. Alternatively, the operational data may be received from multiple robots simultaneously or concurrently.

In some cases, the operational data may comprise information on a geographical location of the one or more robots. In some cases, the operational data may comprise information on a position, an orientation, or a pose of the one or more robots and/or machines. In some cases, the operational data may comprise information on a spatial distribution of the one or more robots and/or machines across an area or an environment.

In some cases, the operational data may comprise information on a battery level or a charge status of the one or more robots and/or machines and/or the one or more components of the one or more robots and/or machines. The battery level or charge status may indicate how long the robot has been in operation, and how long the robot may continue operating before losing power.

In some cases, the operational data may comprise fault information or alarm information for the one or more robots and/or machines and/or the one or more components of the one or more robots and/or machines. In some cases, the fault information may be generated automatically by the one or more robots. In some cases, the fault information may be manually reported or generated by a user or an operator of the one or more robots and/or machines.

In some cases, the operational data may comprise information on work records, a cleaning path, or a cleaning performance for the one or more robots and/or machines. In some cases, the operational data may comprise information on a total time of use or operation for the one or more components.

In any of the embodiments described herein, the operational data may be periodically generated or compiled by the one or more robots and/or machines for transmission or upload to the central server. In any of the embodiments described herein, the operational data may be transmitted from the one or more robots and/or machines to the central server at one or more predetermined or periodic time intervals. In any of the embodiments described herein, the operational data may be transmitted from the one or more robots and/or machines to the central server at one or more time intervals that vary according to a historical usage or a total operational time of the one or more robots.

Changes/Deviations

As described above, in some cases the method may comprise detecting one or more changes or deviations in operation or expected behavior for the one or more robots and/or machines or the one or more components of the one or more robots and/or machines, based at least in part on a comparison of (i) the operational data and (ii) one or more reference values or thresholds associated with the operation or the status of the one or more robots or one or more components of the one or more robots and/or machines. The one or more changes or deviations may comprise or correspond to one or more faults or failures for the one or more robots and/or machines or the one or more components of the one or more robots and/or machines.

In some cases, the one or more reference values or thresholds may correspond to a total operational time for the one or more robots and/or machines or the one or more components. In some non-limiting embodiments, the total operational time may be determined separately for each component or subs-system of a robot or machine.

In some embodiments, the method may comprise assigning one or more entities to service or maintain the at least one robot or machine or component based at least in part on the one or more changes or deviations detected. In some cases, the one or more entities may comprise one or more maintenance or service technicians.

Maintenance/Repair Instructions

As described above, in some cases the method may comprise generating and transmitting one or more maintenance or repair instructions for at least one robot or component to be repaired, maintained, or serviced based at least in part on a priority of maintenance associated with the at least one robot or machine or component. Maintenance, service, or repair of the robots or the various components of the robots may be prioritized according to the schemes and methodologies described in further detail elsewhere herein.

In some embodiments, the maintenance or repair instructions may comprise, for example, instructions for a particular technician to undertake one or more operations to maintain or service the hardware or the software of a robot or machine. In some cases, the maintenance or repair instructions may include a target timeline or date specifying when the one or more maintenance or service operations should be completed by, or a time frame in which the one or more maintenance or service operations should be completed. In some cases, the maintenance or repair instructions may include instructions on how to maintain or repair the hardware or software components of a robot or machine. In some cases, the maintenance or repair instructions may comprise commands, algorithms, or computer logic that control the operation of a maintenance or service station to maintain or service a robot or machine.

In some embodiments, the one or more maintenance or repair instructions may be generated based on one or more pictures or videos provided by a user or an operator of the one or more robots or machines to the central server. In some cases, the one or more pictures or videos may indicate or show the one or more changes or deviations in operation or expected behavior for the one or more robots and/or machines or the one or more components of the one or more robots and/or machines.

In some embodiments, the one or more maintenance or repair instructions may be generated based on machine or component data collected by the one or more robots or machines. In some cases, the machine or component data may be collected using one or more sensors. The one or more sensors may be integrated with a robot or machine, or provided remotely or separately from the robot or machine. In some cases, the machine or component data may comprise information on battery level or usage, motor temperature, or current and voltage levels for the one or more robots or machine or the one or more components of the one or more robots and/or machines. In some cases, the one or more maintenance or repair instructions may be generated based on one or more predetermined parameters associated with the machine or component data. The one or more predetermined parameters may comprise a threshold, a limit, or a target value associated with battery level or usage, motor temperature, or current and voltage levels. The one or more predetermined parameters may inform a service technician as to what maintenance or repair procedures are needed to re-establish the normal, expected behavior or performance of a robot or machine or a component that is operating sub-optimally.

Prioritization

In some embodiments, the method may further comprise prioritizing the one or more maintenance or repair instructions or adjusting the priority of maintenance based on the operational data. In some cases, the method may further comprise prioritizing the one or more maintenance or repair instructions or adjusting the priority of maintenance based on a condition or a state of the at least one component to be serviced or replaced. In some cases, the method may further comprise prioritizing the one or more maintenance or repair instructions or adjusting the priority of maintenance based on a level or a severity of component wear or breakdown.

In some embodiments, the method may further comprise adjusting the priority of maintenance for the at least one robot or machine or component based on (i) additional operational data received for the at least one robot or machine or component and/or (ii) additional operational data received for another robot or machine or component. For example, in some cases additional operational data may indicate that a component breakdown is not as severe as originally anticipated, or that another component is experiencing a more severe deviation in expected performance. In such cases, the priority of maintenance for that component may be reduced relative to a priority of maintenance for the other component. In another example, the additional operational data may indicate that another robot or machine is experiencing a more severe deviation in expected performance. In such cases, the priority of maintenance for one robot or machine may be decreased or increased relative to the priority of maintenance for another robot or machine. In some cases, the priority of maintenance/service/repair for a first component or robot or machine may be adjusted to account for the level or severity of wear, malfunction, or breakdown for a second component or robot or machine.

Scannable Codes

In some embodiments, one or more scannable codes may be used to facilitate machine repair, servicing, and/or maintenance. The one or more scannable codes may be associated with or affixable to the one or more robots or machines or the one or more components of the one or more robots. In some cases, the one or more scannable codes may comprise one or more machine-specific or component-specific codes that are unique to the one or more robots or the one or more components of the one or more robots or machines. In some cases, the one or more scannable codes may comprise a bar code, a quick response (QR) code, an April tag, a unique identifier, or a serial number.

In some embodiments, the method may further comprise identifying or locating a service history for the one or more robots or machines or the one or more components of the one or more robots or machines when a user or an operator of the one or more robots or machines scans the one or more scannable codes. The service history may indicate prior actions taken by a service technician to repair or maintain a robot or machine, and/or any historical deviations or changes in robot behavior or performance that had been previously detected.

In any of the embodiments described herein, the central server may be configured to calculate and report a usage time for the one or more robots and/or machines and/or the one or more components of the one or more robots and/or machines when a service or maintenance technician scans the one or more scannable codes. The usage time may be provided directly to the service or maintenance technician via a display, a web application, or an application user interface. In some cases, the usage time may comprise statistics on machine or component usage as a function of time.

Tracking

In some embodiments, the method may further comprise tracking and providing maintenance or service status information to a user or an operator of the one or more robots and or machines. In some cases, tracking and providing maintenance or service status information may comprise estimating an amount of time needed to maintain, repair, or service the at least one robot or machine or component. The estimated amount of time may be communicated to the user or the operator. The estimated amount of time may change based on a level of priority associated with the repair, servicing, or maintenance of one or more other robots or machines or components.

In some embodiments, the method may further comprise prioritizing the one or more maintenance or repair instructions or adjusting the priority of maintenance based on the estimated amount of time needed to maintain, repair, or service the at least one robot or machine or component, in order to reduce robot or machine downtime and maximize robot or machine operational time. In some cases, the maintenance or repair of a first robot or machine or component may be prioritized over the maintenance or repair of a second robot or machine or component if the first robot or machine or component can be quickly and easily repaired so that the first robot or machine can be redeployed.

Replacement

In some cases, the method may further comprise providing or ordering a replacement robot or machine or one or more replacement components for a user or an operator of the one or more robots or machines experiencing the one or more changes or deviations. The replacement of robots or machines or components may be coordinated with the aid of one or more scannable codes, as described elsewhere herein. In some cases, once an order for a replacement robot or machine is submitted, a robot or machine selected as the replacement unit may undergo a configuration update procedure before the replacement robot or machine is shipped to the consumer or end user. Such configuration update procedure may involve updating the software or firmware of the replacement robot to the latest available or stable version.

In some embodiments, when a robot or machine is ordered, a supplier or distributor may scan a code associated with the order to obtain delivery information. The supplier or distributor may confirm that the robot or machine is in stock and scan a code or ID associated with the robot or machine to be delivered. Such scanning may result in the robot or machine being assigned to the order.

Once the robot or machine is delivered, a customer or end user may then scan the code or ID associated with the robot or machine and confirm receipt of the machine. In some cases, the customer or end user may provide a pickup code to confirm receipt. The pickup code may be provisioned by the supplier or distributor (or any agents thereof), and can be used to ensure that the robot or machine was delivered to and received by the correct customer or end user who originally placed the order. In some cases, the consumer or end user may scan the code or ID associated with the robot or machine to access training materials or guidance/reference materials for operating the robot or machine.

Motion Paths

In some cases, the method may further comprise adjusting an operation of the one or more robots to compensate for or mitigate a suboptimal performance or operation of the at least one robot or component experiencing the one or more changes or deviations. In some cases, the method may further comprise adjusting one or more motion paths or cleaning routines for the one or more robots based on the one or more changes or deviations detected. In some cases, if a first robot is assigned to clean a target area and the first robot breaks down or malfunctions, a second robot in the fleet may be re-assigned or re-programmed to clean the target area.

Software Updates

In some cases, the central server may be configured to provide one or more software updates to the one or more robots or machines to address or mitigate the one or more changes or deviations detected in robot or machine performance or behavior. In some cases, the one or more software updates may be provided as an over the air (OTA) software update.

Alternatively, the one or more maintenance or repair instructions may be provided to a software update server. The software update server may be configured to push one or more software updates to the one or more robots or machines to address or mitigate the one or more changes or deviations detected in robot or machine performance or behavior. The software updates pushed to the one or more robots or machines may be based on the one or more maintenance or repair instructions or the one or more detected changes or deviations in robot or machine operation or performance.

Maintenance Station

In some cases, the one or more maintenance or repair instructions may be transmitted to a repair or maintenance station. The repair or maintenance station may comprise one or more tools or instruments that are usable to repair, maintain, or service various robots or machine components. In some cases, the one or more robots may be configured to autonomously travel to and/or interface with the repair or maintenance station in order to undergo one or more repair, maintenance, or service operations. In some cases, the robots may travel to and/or interface with the repair or maintenance station at a predetermined or scheduled time that is set based on the priority of maintenance associated with the robot or a malfunctioning component of the robot.

Scheduling

In some cases, the method may comprise scheduling one or more service appointments for the one or more robots or machines based on (i) the operational data and/or (ii) a user request to schedule one or more service or maintenance sessions. In some cases, the service appointments may be automatically scheduled based on the operational data for a robot or machine and a level of severity assigned to a faulty component of a robot or machine that is operating sub-optimally. In other cases, the service appointments may be manually scheduled based on a user's availability or preference.

Customer Account and Finance Management

In some cases, the method may further comprise managing or updating a customer account associated with the one or more robots and/or machines based on the operational data processed by the central server, the one or more changes or deviations in operation or expected behavior detected, or the one or more maintenance or repair instructions generated. In some cases, the method may further comprise managing or updating financial information, payment information, or billing information associated with the one or more robots and/or machines based on the operational data processed by the central server, the one or more changes or deviations in operation or expected behavior detected, or the one or more maintenance or repair instructions generated.

Machine Shut Down

In some cases, the central server may be configured to instruct the one or more robots and/or machines to automatically shut down or restrict a performance of one or more tasks or services when a change or deviation in robot operation or performance is detected. In some cases, the central server may be configured to instruct the one or more robots and/or machines to automatically shut down or restrict a performance of one or more tasks or services when a customer renting or leasing the one or more robots and/or machines misses a payment deadline or neglects to make a payment within a grace period associated with the payment deadline. In some cases, the central server may be configured to remotely activate or de-activate individual machines or robots based on operational data or financial considerations/factors associated with the rental or the lease of the individual machines or robots.

Information Technology

The systems and methods disclosed herein may be implemented using one or more information technology (IT) systems. The IT systems may comprise, for example, a customer system that allows end users to view and monitor machine data. In some cases, the customer system may comprise a web application, a Wireless Application Protocol (WAP), a computer application, or a mobile application.

In some embodiments, the IT systems may further comprise a rental system for managing customer relations, field service, supply chain, and financial aspects of renting or leasing out various cleaning machines within a fleet. In some embodiments, the IT systems may further comprise an enterprise resource planning (ERP) system for managing procurement, finances, human resources, etc. The various IT systems may be interconnected and can facilitate the rental or leasing of fleet machines based on data transmitted to, from, or between the IT systems. Such data may include, for example, machine data captured by the machines or the operators using or managing the machines.

In some cases, machine data may be used to facilitate repair or maintenance of one or more machines or robots of a fleet. The repair and/or maintenance services may be coordinated using any one or more of the IT systems described above. The repair and/or maintenance services may be coordinated based on machine data, such as machine or product type, machine location, site or area of operation, map data used by or uploaded to the machine, cleaning reports for the machine or an area in which the machine is operated, cleaning KPIs, etc.

In some cases, access rights to machine data may be modified depending on the entity requesting access. For example, consumers may receive access to a selection of machine data that is different than the machine data transmitted from the machine to the various IT systems described herein.

Computer Systems

In an aspect, the present disclosure provides computer systems that are programmed or otherwise configured to implement methods of the disclosure, e.g., any of the subject methods for fleet management. Referring back to FIG. 19, a computer system 1901 may be programmed or otherwise configured to implement a method for fleet management. The computer system 1901 may be configured to, for example, receive and process operational data corresponding to an operation or a status of one or more robots or machines. The processing of the operational data may comprise comparing (i) the operational data to (ii) one or more reference values or thresholds associated with the operation or the status of the one or more robots and/or machines or one or more components of the one or more robots and/or machines. In some embodiments, the computer system 1901 may be configured to detect one or more changes or deviations in robot operation or the expected behavior for the one or more robots and/or machines or the one or more components of the one or more robots and/or machines, based on the comparison of the operational data to the reference values or thresholds. In some cases, the one or more changes or deviations may indicate or identify at least one robot and/or machines or component to be serviced, maintained, or replaced. In some embodiments, the computer system 1901 may be configured to generate and transmit one or more maintenance or repair instructions for the at least one robot or machine or component based at least in part on a priority of maintenance associated with the at least one robot or machine or component. The computer system 1901 can be an electronic device of a user or a computer system that is remotely located with respect to the electronic device. The electronic device can be a mobile electronic device.

The computer system 1901 may include a central processing unit (CPU, also "processor" and "computer processor" herein) 1905, which can be a single core or multi core processor, or a plurality of processors for parallel processing. The computer system 1901 also includes memory or memory location 1910 (e.g., random-access memory, read-only memory, flash memory), electronic storage unit 1915 (e.g., hard disk), communication interface 1920 (e.g., network adapter) for communicating with one or more other systems, and peripheral devices 1925, such as cache, other memory, data storage and/or electronic display adapters. The memory 1910, storage unit 1915, interface 1920 and peripheral devices 1925 are in communication with the CPU 1905 through a communication bus (solid lines), such as a motherboard. The storage unit 1915 can be a data storage unit (or data repository) for storing data. The computer system 1901 can be operatively coupled to a computer network ("network") 1930 with the aid of the communication interface 1920. The network 1930 can be the Internet, an internet and/or extranet, or an intranet and/or extranet that is in communication with the Internet. The network 1930 in some cases is a telecommunication and/or data network. The network 1930 can include one or more computer servers, which can enable distributed computing, such as cloud computing. The network 1930, in some cases with the aid of the computer system 1901, can implement a peer-to-peer network, which may enable devices coupled to the computer system 1901 to behave as a client or a server.

The CPU 1905 can execute a sequence of machine-readable instructions, which can be embodied in a program or software. The instructions may be stored in a memory location, such as the memory 1910. The instructions can be directed to the CPU 1905, which can subsequently program or otherwise configure the CPU 1905 to implement methods of the present disclosure. Examples of operations performed by the CPU 1905 can include fetch, decode, execute, and writeback.

The CPU 1905 can be part of a circuit, such as an integrated circuit. One or more other components of the system 1901 can be included in the circuit. In some cases, the circuit is an application specific integrated circuit (ASIC).

The storage unit 1915 can store files, such as drivers, libraries and saved programs. The storage unit 1915 can store user data, e.g., user preferences and user programs. The computer system 1901 in some cases can include one or more additional data storage units that are located external to the computer system 1901 (e.g., on a remote server that is in communication with the computer system 1901 through an intranet or the Internet).

The computer system 1901 can communicate with one or more remote computer systems through the network 1930. For instance, the computer system 1901 can communicate with a remote computer system of a user (e.g., an operator of a robot, an entity servicing, maintaining, or repairing a robot, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1901 via the network 1930.

Methods as described herein can be implemented by way of machine (e.g., computer processor) executable code stored on an electronic storage location of the computer system 1901, such as, for example, on the memory 1910 or electronic storage unit 1915. The machine executable or machine readable code can be provided in the form of software. During use, the code can be executed by the processor 1905. In some cases, the code can be retrieved from the storage unit 1915 and stored on the memory 1910 for ready access by the processor 1905. In some situations, the electronic storage unit 1915 can be precluded, and machine-executable instructions are stored on memory 1910.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1901 can include or be in communication with an electronic display 1935 that comprises a user interface (UI) 1940 for providing, for example, a portal for a user or operator to monitor or track an operation or a maintenance/service/repair of one or more robots and/or machines or components. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1905. For example, the algorithm may be configured to (i) receive and process operational data corresponding to an operation or a status of one or more robots and/or machines, (ii) detect one or more changes or deviations in operation or expected behavior for the one or more robots and/or machines or the one or more components of the one or more robots and/or machines based on the comparison of the operational data to one or more reference values or thresholds, and (iii) generate and transmit one or more maintenance or repair instructions for the at least one robot or machine or component based at least in part on a priority of maintenance associated with the at least one robot or component.

While preferred embodiments have been shown and described herein, it will be obvious to those skilled in the art that such embodiments are provided by way of example only. It is not intended that the disclosed technology be limited by the specific examples provided within the specification. While the disclosed technology has been described with reference to the aforementioned specification, the descriptions and illustrations of the embodiments herein are not meant to be construed in a limiting sense. Numerous variations, changes, and substitutions will now occur to those skilled in the art without departing from the disclosed technology. Furthermore, it shall be understood that all aspects of the disclosed technology are not limited to the specific depictions, configurations or relative proportions set forth herein which depend upon a variety of conditions and variables. It should be understood that various alternatives to the embodiments described herein may be employed in practicing the disclosed technology. It is therefore contemplated that the disclosed technology shall also cover any such alternatives, modifications, variations or equivalents. It is intended that the following claims define the scope of the disclosed technology and that methods and structures within the scope of these claims and their equivalents be covered thereby.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The foregoing description merely explains and illustrates the disclosed technology and the disclosed technology is not limited thereto except insofar as the appended claims are so limited, as those skilled in the art who have the disclosure before them will be able to make modifications without departing from the scope of the disclosed technology.

What is claimed is:

1. A method, comprising:
    (a) receiving and processing operational data corresponding to an operation or a status of a plurality of robots or machines at a central server that is in communication with the plurality of robots or machines, wherein the processing of the operational data comprises comparing (i) the operational data to (ii) reference values or thresholds associated with the operation or the status of the plurality of robots or machines or a plurality of components of the plurality of robots or machines, wherein each of the plurality of robots or machines comprise one or more position sensors for sensing a position and an orientation of the robot or machine, and wherein the operational data comprises information on the position and the orientation of the robot or machine;
    (b) detecting, based at least in part on the comparison in (a), a change or deviation in operation or expected behavior for the plurality of robots or machines or the plurality of components, wherein the change or deviation indicate or identify a robot, machine or component to be serviced, maintained, or replaced;
    (c) generating and transmitting maintenance or repair instructions for the robot, machine or component based at least in part on a priority of maintenance associated with the robot, machine or component; and
    (d) adjusting one or more motion paths or cleaning routines for the plurality of robots or machines based on the change or deviation detected in (b).

2. The method of claim 1, wherein (c) further comprises prioritizing the maintenance or repair instructions or adjusting the priority of maintenance based on the operational data.

3. The method of claim 1, wherein (c) further comprises prioritizing the maintenance or repair instructions or adjusting the priority of maintenance based on a condition or a state of the component to be serviced or replaced.

4. The method of claim 1, wherein (c) further comprises prioritizing the maintenance or repair instructions or adjusting the priority of maintenance based on a level or a severity of component wear or breakdown.

5. The method of claim 1, further comprising, prior to (a), providing one or more scannable codes that are associated with or affixable to the plurality of robots or machines or the plurality of components.

6. The method of claim 1, further comprising, subsequent to (b), assigning one or more entities to service or maintain the robot, machine or component based at least in part on the change or deviation detected in (b).

7. The method of claim 5, further comprising identifying or locating a service history for the plurality of robots or machines or the plurality of components when a user or an operator of the plurality of robots or machines scans the one or more scannable codes.

8. The method of claim 5, wherein the one or more scannable codes comprise one or more machine-specific or component-specific codes that are unique to the plurality of robots or machines or the plurality of components.

9. The method of claim 5, wherein the one or more scannable codes comprise a bar code, a quick response (QR) code, an April tag, a unique identifier, or a serial number.

10. The method of claim 1, wherein the operational data comprises information on a battery level or a charge status of the plurality of robots or machines and/or the plurality of components.

11. The method of claim 1, wherein the operational data comprises fault information or alarm information for the plurality of robots or machines and/or the plurality of components.

12. The method of claim 1, wherein the operational data comprises information on work records, a cleaning path, or a cleaning performance for the plurality of robots or machines.

13. The method of claim 1, wherein the operational data comprises a total time of use or operation for the plurality of components.

14. The method of claim 1, wherein the operational data is periodically generated or compiled by the plurality of robots or machines for transmission or upload to the central server.

15. The method of claim 11, wherein the reference values or thresholds correspond to a total operational time for the plurality of robots or machines or the plurality of components.

16. The method of claim 15, wherein the total operational time is determined separately for each component of a robot or machine.

17. The method of claim 1, further comprising, subsequent to (b), adjusting the operation of the plurality of robots or machines to compensate for or mitigate a suboptimal performance or operation of the robot, machine or component experiencing the change or deviation.

18. The method of claim 1, further comprising, subsequent to (c), tracking and providing maintenance or service status information to a user or an operator of the plurality of robots or machines.

19. The method of claim 18, wherein tracking and providing maintenance or service status information comprises estimating an amount of time needed to maintain, repair, or service the robot, or machine or component.

20. The method of claim 19, wherein (c) further comprises prioritizing the maintenance or repair instructions or adjusting the priority of maintenance based on the estimated amount of time needed to maintain, repair, or service the robot, machine or component in order to reduce robot or machine downtime and maximize robot or machine operational time.

21. The method of claim 1, further comprising, subsequent to (c), providing or ordering a replacement robot or machine or one or more replacement components for a user or an operator of the plurality of robots or machines experiencing the change or deviation.

22. The method of claim 1, further comprising, subsequent to (c), adjusting the priority of maintenance for the robot, machine or component based on (i) additional operational data received for the robot, machine or component and/or (ii) additional operational data received for another robot or machine or component.

23. The method of claim 1, wherein the maintenance or repair instructions are generated based on one or more pictures or videos provided from a user or an operator of the plurality of robots or machines to the central server, wherein the one or more pictures or videos indicate or show the change or deviation in operation or expected behavior for the plurality of robots or machines or the plurality of components.

24. The method of claim 1, wherein the maintenance or repair instructions are generated based on (i) robot or machine or component data collected by the plurality of robots or machines using one or more sensors and/or (ii) one or more predetermined parameters associated with the robot or machine or component data.

25. The method of claim 1, further comprising, subsequent to (b), scheduling one or more service appointments for the plurality of robots or machines based on (i) the operational data and/or (ii) a user request to schedule one or more service or maintenance sessions.

26. The method of claim 1, further comprising managing or updating a customer account associated with the plurality of robots or machines based on the operational data processed in (a), the change or deviation in operation or expected behavior detected in (b), or the maintenance or repair instructions generated in (c).

27. The method of claim 1, further comprising managing or updating financial information, payment information, or billing information associated with the plurality of robots or machines based on the operational data processed in (a), the change or deviation in operation or expected behavior detected in (b), or the maintenance or repair instructions generated in (c).

* * * * *